United States Patent
Hochstetter et al.

(10) Patent No.: US 12,319,018 B2
(45) Date of Patent: Jun. 3, 2025

(54) FIBROUS MATERIAL IMPREGNATED WITH THERMOPLASTIC POLYMER HAVING A THICKNESS OF LESS THAN OR EQUAL TO 100MM AND METHOD FOR THE PRODUCTION THEREOF

(71) Applicant: ARKEMA FRANCE, Colombes (FR)

(72) Inventors: Gilles Hochstetter, Colombes (FR); Thibaut Savart, Lacq (FR); Arthur Pierre Babeau, Lacq (FR); Anthony Florencie, Bordeaux (FR); Patrice Gaillard, Lacq (FR); Axel Salinier, Lacq (FR)

(73) Assignee: ARKEMA FRANCE, Puteaux (FR)

( * ) Notice: Subject to any disclaimer, the term of this patent is extended or adjusted under 35 U.S.C. 154(b) by 1120 days.

(21) Appl. No.: 17/040,230

(22) PCT Filed: Mar. 19, 2019

(86) PCT No.: PCT/FR2019/050620
§ 371 (c)(1),
(2) Date: Sep. 22, 2020

(87) PCT Pub. No.: WO2019/180370
PCT Pub. Date: Sep. 26, 2019

(65) Prior Publication Data
US 2021/0016523 A1 Jan. 21, 2021

(30) Foreign Application Priority Data
Mar. 23, 2018 (FR) .................................... 1852551

(51) Int. Cl.
*B29C 70/52* (2006.01)
*B29K 101/10* (2006.01)
(Continued)

(52) U.S. Cl.
CPC ............. *B29C 70/521* (2013.01); *C08J 5/042* (2013.01); *C08J 5/243* (2021.05); *C08J 5/249* (2021.05);
(Continued)

(58) Field of Classification Search
CPC ......... B29C 70/521; C08J 5/042; C08J 5/249; C08J 5/243; C08J 2300/22; C08J 2300/24; C08J 2377/06; B29K 2101/10
(Continued)

(56) References Cited

U.S. PATENT DOCUMENTS 5,057,338 A 10/1991 Baucom et al.
5,128,199 A 7/1992 Iyer et al.
(Continued)

FOREIGN PATENT DOCUMENTS

EP 0201367 A1 11/1986
EP 0287427 A1 10/1988
(Continued)

OTHER PUBLICATIONS

Wikipedia—"Nylon 6," published Mar. 2023, available at https://en.wikipedia.org/wiki/Nylon_6 (Year: 2023).*
(Continued)

*Primary Examiner* — Camie S Thompson
(74) *Attorney, Agent, or Firm* — Boone IP Law

(57) ABSTRACT

An impregnated fibrous material including at least one fibrous material of continuous fibers and: at least one non-reactive thermoplastic polymer matrix, or at least one reactive thermoplastic prepolymer, which is a precursor of the non-reactive thermoplastic polymer, optionally mixed with a chain extender, wherein the at least one non-reactive thermoplastic polymer or the reactive prepolymer is an amorphous polymer or prepolymer having a glass transition temperature such that Tg≥80° C., or is a semi-crystalline
(Continued)

polymer or prepolymer having a melting temperature Tf≥150° C., the fiber content in the pre-impregnated fibrous material being between 45 and 65 volume %, and the average thickness of the impregnated fibrous material being less than or equal to 100 μm, independently of the number of fibers present in the fibrous material before impregnation.

23 Claims, 10 Drawing Sheets

(51) Int. Cl.
*C08J 5/04* (2006.01)
*C08J 5/24* (2006.01)
(52) U.S. Cl.
CPC ....... *B29K 2101/10* (2013.01); *C08J 2300/22* (2013.01); *C08J 2300/24* (2013.01)
(58) Field of Classification Search
USPC ............... 428/292.1, 299.1, 297.4, 300.1
See application file for complete search history.

(56) References Cited

U.S. PATENT DOCUMENTS

| | | | |
|---|---|---|---|
| 5,936,861 | A | 8/1999 | Jang et al. |
| 2003/0175520 | A1 | 9/2003 | Grutta et al. |
| 2006/0093802 | A1 | 5/2006 | Tsai et al. |
| 2007/0191293 | A1 | 8/2007 | Langston et al. |
| 2010/0068518 | A1 | 3/2010 | Honma et al. |
| 2013/0062806 | A1 | 3/2013 | Mitadera |
| 2013/0106014 | A1 | 5/2013 | Ishibashi et al. |
| 2014/0005331 | A1 | 1/2014 | Johnson et al. |
| 2014/0363654 | A1 | 12/2014 | Roth et al. |
| 2017/0037186 | A1 | 2/2017 | Hochstetter et al. |
| 2017/0106606 | A1 | 4/2017 | Toyozumi et al. |
| 2017/0165875 | A1 | 6/2017 | Gaillard et al. |
| 2017/0183465 | A1 | 6/2017 | Kawabe et al. |
| 2018/0162069 | A1* | 6/2018 | Matsumoto ............. B29C 43/20 |
| 2018/0162073 | A1* | 6/2018 | Fujiura ................... C08J 5/041 |
| 2018/0251601 | A1 | 9/2018 | Capelot et al. |
| 2018/0362760 | A1 | 12/2018 | Imai et al. |

FOREIGN PATENT DOCUMENTS

| | | | | |
|---|---|---|---|---|
| EP | 0324680 | A2 | 7/1989 | |
| EP | 0406067 | A1 | 1/1991 | |
| EP | 1505099 | A2 | 2/2005 | |
| EP | 3095901 | A1 | 11/2016 | |
| EP | 3418019 | A1 | 12/2018 | |
| FR | 3039554 | A1 | 2/2017 | |
| JP | 2003181832 | A | 7/2003 | |
| JP | 2008 231237 | A | 10/2008 | |
| JP | 2013 006962 | A | 1/2013 | |
| JP | 2013103941 | A | 5/2013 | |
| JP | 2013533137 | A | 8/2013 | |
| JP | 2015505879 | A | 2/2015 | |
| JP | 201611403 | A | 1/2016 | |
| JP | 2016027956 | A | 2/2016 | |
| JP | 2016216654 | A | 12/2016 | |
| JP | 2017507045 | A | 3/2017 | |
| WO | 2011156693 | A2 | 12/2011 | |
| WO | 2012002417 | A1 | 1/2012 | |
| WO | 2012066241 | A2 | 5/2012 | |
| WO | 2012140785 | A1 | 10/2012 | |
| WO | 2013086258 | A1 | 6/2013 | |
| WO | 2015121583 | A2 | 8/2015 | |
| WO | 2016062896 | A1 | 4/2016 | |
| WO | WO-2017017388 | A1 * | 2/2017 | ............... C08J 5/10 |
| WO | 2015163408 | A1 | 4/2017 | |
| WO | 2018011495 | A1 | 1/2018 | |

OTHER PUBLICATIONS

"Nylon 12"; Wikipedia, Jul. 14, 2022; <https://en.wikipedia.org/wiki/Nylon_12>. (Year: 2022), 2 pages.

El-Dessouky, H. M., et al."ULTRA-LIGHT Weight Thermoplastic Composites: Tow-Spreading Technology" ECCM15—15th European Conference on Composite Materials, Venice, Italy, Jun. 24-28, 2012, 8 pages.

International Search Report (with English Translation) and Written Opinion issued in corresponding International Patent Application No. PCT/FR2019/050620, 14 pages (Jun. 27, 2019).

Yamashita S. et al., "Volume resistivity of ultra-thin chopped carbon fiber tape reinforced thermoplastics," Composites Part A: Applied Science and Manufacturing, Elsevier, Amsterdam, NL, vol. 90, Aug. 22, 2016 (Aug. 22, 2016), p. 598-605.

International Search Report (PCT/ISA/210) issued on Oct. 21, 2019, by the European Patent Office as the International Searching Authority for International Application No. PCT/FR2019/050621.

Written Opinion (PCT/ISA/237) issued on Oct. 21, 2019, by the European Patent Office as the International Searching Authority for International Application No. PCT/FR2019/050621.

Office Action (Notice of Reasons for Refusal) issued on Jul. 5, 2022, by the Japanese Patent Office in corresponding Japanese Patent Application No. 2020-549763, and an English Translation of the Office Action. (10 pages).

Office Action (Notice of Reasons for Refusal) issued on Nov. 22, 2021, by the Japanese Patent Office in corresponding Japanese Patent Application No. 2020-550677, and an English Translation of the Office Action. (21 pages).

Office Action (Notice of Reasons for Refusal) issued on Nov. 22, 2021, by the Japanese Patent Office in corresponding Japanese Patent Application No. 2020-549763, and an English Translation of the Office Action. (17 pages).

\* cited by examiner

FIBROUS MATERIAL IMPREGNATED WITH THERMOPLASTIC POLYMER HAVING A THICKNESS OF LESS THAN OR EQUAL TO 100MM AND METHOD FOR THE PRODUCTION THEREOF

FIELD OF THE INVENTION

The present invention relates to a fibrous material of average thickness less than or equal to 100 μm, particularly a single-layer material, impregnated with a thermoplastic polymer.

More specifically, the invention relates to a fibrous material, particularly a single-layer material, impregnated with thermoplastic polymer, wherein, in particular the fiber number for carbon fibers is greater than or equal to 12K, or the grammage of the glass fiber is greater than or equal to 1,200 Tex, and for which the fiber content by volume is particularly constant, specifically the fiber content by volume is constant and at least 70% of the volume of the impregnated fibrous material.

The invention also relates to its method for preparing a particularly single-layer fibrous material of average thickness of less than or equal to 100 μm, and to its use for the manufacturing of composite parts, in particular by automatic laying by means of a robot or by a method of filament winding.

In the present disclosure "fibrous material" refers to an assembly of reinforcing individual fibers. After impregnation with the resin, it is presented in the form of a tape.

The term "tape" refers to a strip, which is a semi-finished product of small thickness, not calibrated in width and in thickness, and composed of a single roving of fibers, or a thin tape composed of one or more fiber rovings, calibrated in thickness and in width.

In all cases, the thickness of the tape is less than or equal to 100 μm, preferably between 10 and 100 μm.

Such impregnated fibrous materials are in particular suitable for producing light composite materials for manufacturing mechanical parts having a three-dimensional structure and having good mechanical and thermal properties. When the fibers are made from carbon and/or the resin is filled with suitable additives, these fibrous materials are capable of discharging electrostatic charges. The use of flame-retardant resins or flame-retardant additives in resins that are not flame retardant allows the impregnated fibrous materials to withstand fires. They therefore have properties compatible with production of parts in particular in the mechanical, aeronautic, naval, automobile, oil and gas, in particular offshore, gas storage, energy, health and medical, sports and recreation, and electronics fields.

Such impregnated fibrous materials are also called composite materials. They comprise the fibrous material composed of reinforcing fibers, and a matrix composed of the polymer impregnating the fibers. The first role of this matrix is to keep the reinforcing fibers in a compact shape and to give the desired shape to the final product. This matrix also ensures the charge transfer between the fibers, and therefore conditions the mechanical strength of the composite. Such a matrix also serves to protect the reinforcing fibers against abrasion and an aggressive environment, to control the surface appearance and to disperse any charges between the fibers. The role of this matrix is important for the long-term holding of the composite material, in particular regarding fatigue and creep.

BACKGROUND ART

Good quality three-dimensional composite parts produced from impregnated fibrous materials generally follows from mastery of the method for impregnating the reinforcing fibers with thermoplastic polymer and therefore of the resulting impregnated fibrous material.

To date, the manufacture of tapes of fibrous material reinforced by impregnation with thermoplastic polymer or thermosetting polymer was carried out using several methods that particularly depend on the nature of the polymer, the desired type of final composite material and its field of applications, some of these methods being constituted by an impregnation step followed by a step for hot rolling of the impregnated fibrous material or a drying step optionally followed by a step for melting of the thermoplastic polymer.

Thus, wet impregnation technologies or those using a liquid precursor or a precursor with a very low viscosity, polymerizing in situ, are often used to impregnate the reinforcing fibers with thermosetting polymers, such as epoxy resins for example, as described in patent WO2012/066241A2. These technologies are generally not directly applicable to impregnating with thermoplastic polymers because these rarely have liquid precursors.

Impregnation methods by crosshead-die extrusion of a molten polymer are suitable for the use of low viscosity thermoplastic polymers only. Thermoplastic polymers, in particular those with a high glass transition temperature, have a viscosity in the molten state that is too high to allow a satisfactory impregnation of the fibers and semi-finished or finished products of good quality.

Application US 2014/0005331A1 describes a method for preparing fibers impregnated with a polymer resin, the obtained tape being asymmetrical, that is it has one face that is rich in polymer and an opposite face that is rich in fibers.

The method is carried out by molten route with a device only allowing majority impregnation on one of its faces.

Another known method for impregnation is the continuous passage of fibers in an aqueous polymer powder dispersion or an aqueous polymer particle dispersion or aqueous polymer emulsion or suspension. Reference may for example be made to document EP0324680. In this method, a dispersion of micrometric powders is used (about 20 μm). After quenching in the aqueous solution, the fibers are impregnated by the polymer powder. The method then involves a drying step consisting of passing the impregnated fibers in a first furnace in order to evaporate the water absorbed during the quenching. A heat-treatment step consisting of passing the impregnated and dried fibers in a second heating zone, at a high temperature, is next necessary to melt the polymer so that it adheres, is distributed and covers the fibers.

The drying step of this method causes a porosity in the impregnated fibers by evaporation of the water. Additionally, the resulting material is a fibrous material covered with polymer and therefore a multilayer material.

Document EP 0,406,067, filed in the joint names of Atochem and the French State, as well as document EP 0,201,367, describe a polymer powder impregnation technique on fluidized bed. The fibers penetrate a closed fluidization tank where, as concerns EP 0,406,067, they are optionally separated from one another using ribbed rollers or cylinders, the fibers being electrostatically charged, by friction against these rollers or cylinders. This electrostatic charge allows the polymer powder to stick on the surface of the fibers and thus to impregnate them.

As above, the resulting material is therefore a fibrous material covered with polymer and therefore a multilayer material.

International application WO 2016/062896 describes a roving powdering by an electrostatic method with deliberate charge, by grounding of the roving and applying a potential difference between the tip of a spray gun or powdering nozzles and the roving.

International application WO 2015/121583 describes a method for manufacturing a fibrous material impregnated by impregnation of said material in a fluidized bed, then hot rolling said roving, allowing shaping of said roving(s) parallel to said material.

The hot rolling is carried out downstream from the impregnation device and makes it possible to homogenize the distribution of the polymer and to impregnate the fibers, but does not make it possible to obtain a ribbon impregnated homogeneously. The porosity obtained is not quantified.

The quality of the impregnated fibrous material ribbons and therefore the quality of the final composite material depends not only on the homogeneity and impregnation of the fibers and therefore the control and reproducibility of the porosity of the impregnated fibrous materials and the single layer appearance thereof, but also on the dimension and more specifically the width and thickness of the final ribbons. Uniformity and control of these dimensional parameters in fact improves the mechanical strength of the composite materials resulting (from the ribbons).

The fibers, which may be used in the composition of the fibrous materials, may have different linear grammages or yardage or yarn count or "tex" and/or be in different numbers in the rovings. Also, the most conventionally used rovings are composed of 600 to 4,800 tex for glass fibers and of 3,000 (3K), 6,000 (6K), 12,000 (12K), 24,000 (24K), 48,000 (48K), 50,000 (50K) or 400,000 (400K) for the carbon fibers. The carbon fibers generally have a diameter close to 7-8 µm and the glass fibers have a diameter of about 13, 15, 17 or 20 µm, for example.

The most common practice for manufacturing webs is based on an assembly of rovings and resin, in order to form a volume of composite material; however, this volume is greater than that of the web to be manufactured. This volume is implemented by calendering in the form of a web with calibrated thickness having the desired thickness, but which will be wider than the final web and which will generally have irregular edges. This web is then cut (slitting operation) to obtain the final web calibrated to the desired width, also called calibrated web.

When it is desired to eliminate the cutting operation (slitting operation) in order to avoid material offcuts, damage to the fibers or the cost of an additional step in the manufacture of the web, the step of manufacturing the web is eliminated and an assembly of rovings and resin is made, the volume of which corresponds exactly to the final volume of the calibrated web to be manufactured. The major consequence of such a method is that the volume of material will depend directly on the linear grammage of the fibers and on the fiber content. For this reason, when the fiber content is fixed, only a discrete number of volumes of material can be produced and they are a function of the grammages of the commercially available rovings.

In other words, the calibrated web manufactured without slitting can have any width or thickness and the fiber grammage of the calibrated web can only be equal to an integer number of times that of the initial roving(s).

Taking into account the demand from manufacturers, for example a demand for a 194 g/m2 composite of carbon fibers containing 34% by weight of a resin of density 1.29, the calibrated web generally has a thickness of approximately 190 µm and a width of approximately 300 mm and requires the use of 72 rovings of 12K.

In the usual methods, the web is manufactured by assembling dry fiber rovings, which are then impregnated with resin and the web obtained is then slit (by slitting). Nevertheless, when it is desired to manufacture this web at a high production speed, the impregnation of webs of this thickness is not carried out correctly at the core of the rovings and does not make it possible to obtain homogeneous impregnation of the rovings.

The current techniques for impregnating fibrous materials and shaping such impregnated fibrous materials in the form of calibrated webs also have other drawbacks.

Slitting a web to obtain tapes involves splicing these tapes because this web is generally of a length limited to a fraction of the length of the reels of dry fiber rovings, this being because of its weight and the handling problems that this causes. The splicing induces an additional manufacturing cost for the tape as well as manufacturing defects in the final composite parts, which can initiate their premature breaking.

In addition to the drawbacks mentioned above, web slitting generates significant problems of cut fibers and exposed fibrils, which can generate dust and electric arcs during robot laying and can lead to malfunctions of the robots and/or imperfections on the composites. This potentially incurs repair costs for the robots, production stoppages and the discarding of non-compliant products. Lastly, during the slitting step, a non-negligible quantity of fibers is damaged, causing loss of property, and particularly a reduction in the mechanical strength and conductivity, of the tapes of impregnated fibrous material.

It is therefore necessary to be able to have available unslit and unspliced fibrous material (for example, having approximately the length of the initial dry fiber roving), and well impregnated even during manufacture at high production speed, particularly a tape in the form of a strip of variable width and thickness or a thin tape having a calibrated width and thickness, the average thickness of the strip or of the thin tape being less than or equal to 100 µm so as to guarantee, even during manufacture at high production speed, homogeneous and core impregnation of the fiber rovings, regardless of the number of filaments present in the rovings of the initial fibrous material before impregnation.

The object of the invention is therefore to remedy at least one of the disadvantages from the prior art and, particularly the object is to produce impregnated fibrous material as defined above.

The invention aims particularly at providing in particular a single-layer impregnated fibrous material, and in particular whose number of fibers for carbon fibers is greater than or equal to 12K, or whose grammage for the glass fiber is greater than or equal to 1,200 Tex, particularly greater than or equal to 2,400 Tex, greater than or equal to 4,800 Tex, and whose content of fibers by volume is particularly constant in at least 70% of the volume of the impregnated fibrous material, the impregnation of the fibers being homogeneous, said material having controlled dimensions, with a reduced, controlled and reproducible porosity and a homogeneous distribution of the fibers of said fibrous material in the impregnated fibrous material, on which the performance of the final composite part depends.

BRIEF DESCRIPTION OF THE INVENTION

To this end, the object of the invention is an impregnated fibrous material comprising at least one fibrous material consisting of continuous fibers and:

at least one non-reactive thermoplastic polymer matrix, or
at least one reactive thermoplastic prepolymer, precursor of said non-reactive thermoplastic polymer, optionally mixed with a chain extender,
characterized in that said at least one non-reactive thermoplastic polymer or said reactive prepolymer is an amorphous polymer or prepolymer having a glass transition temperature such that Tg≥80° C., especially Tg≥100° C., particularly ≥120° C., more particularly ≥140° C., or is a semi-crystalline polymer or prepolymer having a melting temperature Tm 150° C., the fiber content in said impregnated fibrous material being between 45 and 65% by volume, preferably between 50 and 60% by volume, especially between 54 and 60%, and the average thickness of said impregnated fibrous material being less than or equal to 100 μm, independently of the number of fibers present in said fibrous material before impregnation.

Advantageously, PA6 is excluded from the definition of thermoplastic polymer or thermoplastic prepolymer.

Advantageously, the average thickness of said impregnated fibrous material is between 10 μm and 100 μm.

The measurement of the average thickness and width of said impregnated fibrous material can be carried out by laser measurement as described in WO 2016/062896.

In the present disclosure, the term "strip" is used to denote an impregnated fibrous material of uncalibrated width and thickness with an average thickness of less than or equal to 100 μm.

Throughout the disclosure, the width of the strip corresponds to an average width and the thickness of the strip corresponds to an average thickness, that is, an average width and thickness over the entire length of the strip. This means that the width and thickness may vary along the strip but that on average the thickness is less than or equal to 100 μm. The way to verify that the average thickness is less than 100 μm over the entire length of the strip is taking measurements on statistically representative samples of the strip by non-destructive measuring means.

The expression "uncalibrated width" means that the width of the strip is not constant, the width possibly being equal to I +/−20%, particularly I +/−15%, in particular I +/−10% where I represents the average width.

The expression "uncalibrated thickness" means that the thickness of the strip is not constant over its entire length, it being possible for the thickness to be equal to e +/−20%, particularly e +/−15%, in particular e +/−10% where e represents the average thickness.

Advantageously, the expressions "uncalibrated width" and "uncalibrated thickness" respectively mean that the width is equal to I +/−20% of the average width and the thickness is equal to e +/−20% of the average thickness.

Advantageously, the expressions "uncalibrated width" and "uncalibrated thickness" respectively mean that the width is equal to I +/−20% of the average width and the thickness is equal to e +/−15% of the average thickness.

Advantageously, the expressions "uncalibrated width" and "uncalibrated thickness" respectively mean that the width is equal to I +/−20% of the average width and the thickness is equal to e +/−10% of the average thickness.

Advantageously, the expressions "uncalibrated width" and "uncalibrated thickness" respectively mean that the width is equal to I +/−15% of the average width and the thickness is equal to e +/−20% of the average thickness.

Advantageously, the expressions "uncalibrated width" and "uncalibrated thickness" respectively mean that the width is equal to I +/−10% of the average width and the thickness is equal to e +/−20% of the average thickness.

Advantageously, the expressions "uncalibrated width" and "uncalibrated thickness" respectively mean that the width is equal to I +/−15% of the average width and the thickness is equal to e +/−15% of the average thickness.

Advantageously, the expressions "uncalibrated width" and "uncalibrated thickness" respectively mean that the width is equal to I +/−10% of the average width and the thickness is equal to e +/−15% of the average thickness.

Advantageously, the expressions "uncalibrated width" and "uncalibrated thickness" respectively mean that the width is equal to I +/−15% of the average width and the thickness is equal to e +/−10% of the average thickness.

Advantageously, the expressions "uncalibrated width" and "uncalibrated thickness" respectively mean that the width is equal to I +/−10% of the average width and the thickness is equal to e +/−10% of the average thickness.

Nevertheless, the average width of the strip depends on the number of fibers present in the roving.

The term "thin tape" is used to denote an impregnated fibrous material of calibrated width and thickness with an average thickness of less than or equal to 100 μm.

Throughout the disclosure, the width of the thin tape corresponds to an average width and the thickness of the thin tape corresponds to an average thickness, that is, an average width and thickness over the entire length of the thin tape. This means that the width and thickness may vary along the thin tape but that on average the thickness is less than or equal to 100 μm. The way to verify that the average thickness is less than 100 μm over the entire length of the strip is taking measurements on statistically representative samples of the thin tape by non-destructive measuring means. The expression "calibrated width" means that the width of the thin tape is constant over its entire length, wherein the width can be I +/−5%, in particular I +/−2% where I represents the average width.

The expression "calibrated thickness" means that the average thickness of the thin tape is constant over its entire length, and the thickness can be equal to e +/−5%, in particular the thickness being equal to e +/−2% where e represents the average thickness.

Advantageously, the expressions "calibrated width" and "calibrated thickness" respectively mean that the width is equal to I +/−5% of the average width and the thickness is equal to e +/−5% of the average thickness.

Advantageously, the expressions "calibrated width" and "calibrated thickness" respectively mean that the width is equal to I +/−5% of the average width and the thickness is equal to e +/−2%.

Advantageously, the expressions "calibrated width" and "calibrated thickness" respectively mean that the width is equal to I +/−2% of the average width and the thickness is equal to e +/−5% of the average thickness.

Advantageously, the expressions "calibrated width" and "calibrated thickness" respectively mean that the width is equal to I +/−2% of the average width and the thickness is equal to e +/−2% of the average thickness.

Nevertheless, the average width of the thin tape depends on the number of fibers present in the roving.

Advantageously, the number of fibers in said fibrous material is for carbon fibers greater than or equal to 3K, in particular greater than or equal to 6K, particularly greater than or equal to 12K.

Advantageously, the number of fibers in said fibrous material for carbon fibers is greater than or equal to 12K, in particular selected from 12K, 24K, 48K, 50K and 400K, particularly ≥12K, 24K, 48K and 50K, or the grammage for the glass fiber is greater than or equal to 1,200 Tex, particularly greater than or equal to 2,400 Tex, greater than or equal to 4,800 Tex.

Tex means 1000 m of base yarn weighs 1 g.

The inventors have therefore found that, whatever the starting roving, that is, whatever the number of filaments or fibers in the starting roving, for high fiber contents greater than 45% by volume the impregnation is correctly carried out, at high production speed, only if the strip or the thin tape has an average thickness of less than or equal to 100 μm.

It is quite obvious that if the average thickness and the desired average width are fixed (assuming a negligible porosity level), it is then possible to determine the number of necessary fibers present in the roving.

For example, for an average width of 50 mm (thin tape, for example, of polyamide) with a carbon fiber content of 50% by volume and an average thickness of 100 μm, it will be necessary to use a roving of 50K.

For an average width of 50 mm (thin tape, for example, of polyamide) with a carbon fiber content of 62% by volume and an average thickness of 60 μm, it will be necessary to use a roving of 48K.

The roving used is therefore a single roving as opposed to a multi-roving which would then correspond to an association of tape or thin web produced from each of the rovings constituting the multi-roving.

Advantageously, in the absence of reheating, the impregnated fibrous material is non-flexible.

This means that the impregnated fibrous material is not capable of assuming a complex shape at ambient temperature and that it can do so only beyond the Tm of the resin. In other words, the impregnated fibrous material does not have drapability.

The fibers of the fibrous material may or may not be sized.

"Sizing" denotes the surface treatments applied to the reinforcing fibers leaving the nozzle (textile sizing) and on the fabrics (plastic sizing).

"Textile" sizing applied on the filaments leaving the nozzle consists of depositing a bonding agent ensuring the cohesion of the filaments relative to one another, decreasing abrasion and facilitating subsequent handling (weaving) and preventing the formation of electrostatic charges. The sizing may be carried out on the surface of the fibers, for example, by depositing epoxy resin in solution on the carbon fibers.

Advantageously, the fibers of the fibrous material are non-sized fibers.

The term "non-sized" means that the fiber is either not initially sized and therefore has not undergone surface treatment, or that the fiber has been de-sized prior to use.

Advantageously, the content of fibers by volume is constant in at least 70% of the volume of the impregnated fibrous material, particularly in at least 80% of the volume of the impregnated fibrous material, in particular in at least 90% of the volume of the impregnated fibrous material, more particularly in at least 95% of the volume of the impregnated fibrous material.

Advantageously, the distribution of the fibers is homogeneous in at least 95% of the volume of the impregnated fibrous material.

The fiber rate by volume is measured locally on a representative elementary volume (REV).

The term "constant" means that the fiber content by volume is constant to within any measurement uncertainty, which is plus or minus 1%.

The term "homogeneous" means that the impregnation is uniform and that there are no dry, that is, non-impregnated, fibers and that, conversely, there is no zone of pure resin without fiber in at least 95% of the volume of the tape of impregnated fibrous material.

Advantageously, the porosity level in said impregnated fibrous material is less than 10%, in particular less than 5%, particularly less than 2%.

Advantageously, said impregnated fibrous material is a single-layer material.

The term "single layer" means that when the fibrous material is impregnated, said fibrous material and polymer are indissociable from each other and form a material composed of a single fiber and polymer-based layer, since the impregnation is carried out particularly homogeneously and to the core, and particularly with at least one spreading during the impregnation.

The various characteristics of thickness, number of fibers, fiber content, sizing, fiber distribution and the single-layer characteristic may each be combined with one or more others in combination with those of the object of the invention and can be the subject of as many embodiments as of possible combinations forming an integral part of the invention.

DETAILED DESCRIPTION

Polymer Matrix

Figure 1:
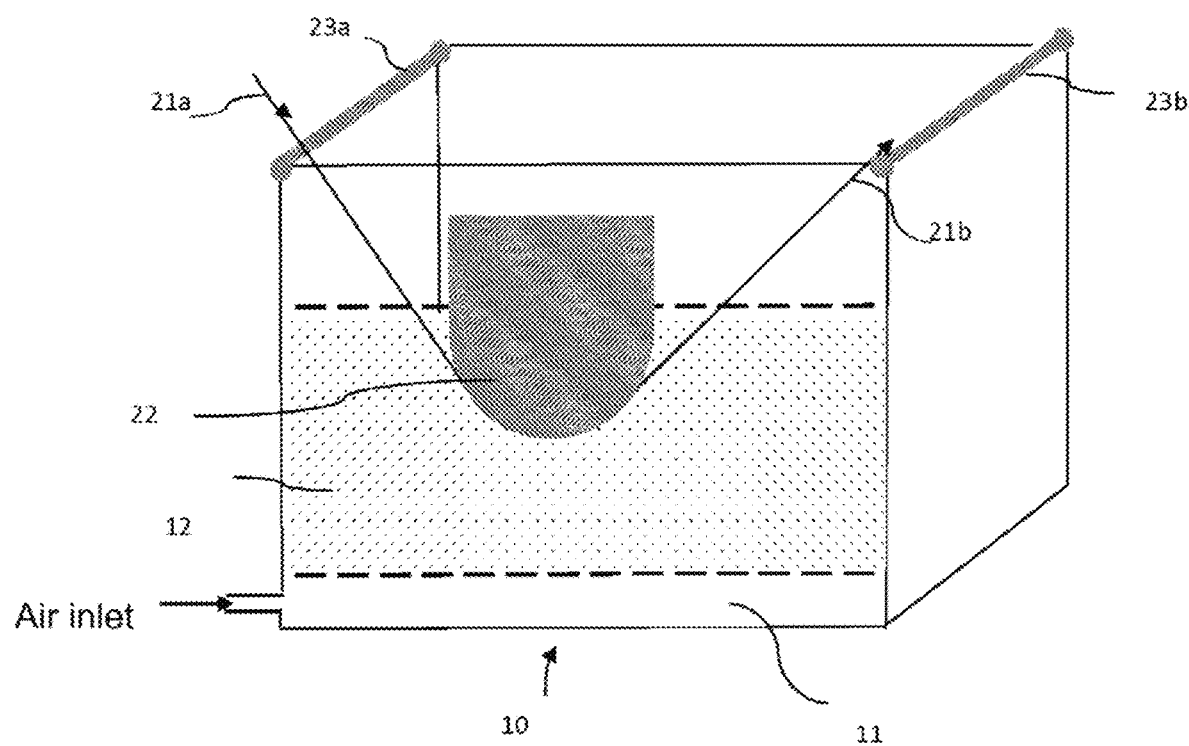
FIG. 1 shows an example of a tank provided with a supporter.

Thermoplastic, or thermoplastic polymer, refers to a material that is generally solid at ambient temperature, which may be semi-crystalline or amorphous, and that softens during a temperature increase, in particular after passage by its glass transition temperature (Tg) and flows at a higher temperature when it is amorphous, or that may exhibit a sharp transition upon passing its so-called melting temperature (Tm) when it is semi-crystalline, and become solid again when the temperature decreases below its crystallization temperature (for semi-crystalline) and below its glass transition temperature (for an amorphous).

The Tg and Tm are determined by differential scanning calorimetry (DSC) according to standard 11357-2:2013 and 11357-3:2013, respectively.

Regarding the polymer constituting the pre-impregnation matrix of the fibrous material, it is advantageously a thermoplastic polymer or a mixture of thermoplastic polymers. This polymer or mixture of thermoplastic polymers can be ground in powder form, so that it can be used in a device such as a tank, in particular in a fluidized bed or aqueous dispersion.

Advantageously, PA6 is excluded from the definition of thermoplastic polymer.

The device in tank form, in particular in a fluidized bed, may be open or closed.

Optionally, the thermoplastic polymer or blend of thermoplastic polymers further comprises carbon-based fillers, in particular carbon black or carbon-based nanofillers, preferably selected from among graphenes, carbon nanotubes, carbon nanofibrils or mixtures thereof. These fillers make it possible to conduct electricity and/or heat, and therefore to facilitate the melting of the polymer matrix when it is heated.

Optionally, said thermoplastic polymer comprises at least one additive, in particular selected from among a catalyst, an antioxidant, a heat stabilizer, a UV stabilizer, a light stabilizer, a lubricant, a filler, a plasticizer, a flame retardant, a nucleating agent, a chain extender and a dye, an electrical conductor, a heat conductor or a mixture thereof.

Advantageously, said additive is selected from among a flame retardant, an electrical conductor and a heat conductor.

According to another variant, the thermoplastic polymer or mixture of thermoplastic polymers can further comprise liquid crystal polymers or cyclized polybutylene terephthalate, or mixtures containing the latter, such as the CBT100 resin marketed by the CYCLICS CORPORATION. These compounds in particular make it possible to fluidify the polymer matrix in molten state, for better penetration to the core of the fibers. Depending on the nature of the polymer, or mixture of thermoplastic polymers, used to make the pre-impregnation matrix, in particular its melting temperature, one or the other of these compounds will be selected.

The thermoplastic polymers included in the composition of the pre-impregnation matrix of the fibrous material can be selected from among:
- the polymers and copolymers from the family of aliphatic, cycloaliphatic or semi-aromatic polyamides (PA) (also called polyphthalamides (PPA)),
- polyureas, in particular aromatic polyureas,
- polymers and copolymers from the family of acrylics such as polyacrylates, and more particularly polymethyl methacrylate (PMMA) or derivatives thereof,
- polymers and copolymers from the family of poly(aryletherketones) (PAEK) such as polyether ether ketone (PEEK), or poly(aryletherketonesketones) (PAEKK) such as poly(etherketoneketone) (PEKK) or derivatives thereof,
- aromatic polyether-imides (PEI),
- polyarylsulfides, in particular polyphenyl sulfides (PPS),
- polyarylsulfides, in particular polyphenylene sulfones (PPSU),
- polyolefins, in particular polypropylene (PP);
- polylactic acid (PLA),
- polyvinyl alcohol (PVA),
- fluorinated polymers, in particular polyvinylidene fluoride (PVDF), polytetrafluoroethylene (PTFE) or polychlorotrifluoroethylene (PCTFE), and mixtures thereof.

Advantageously, PA6 is excluded from the definition of aliphatic polyamides.

Advantageously, when said polymer is a mixture of two polymers P1 and P2, the proportion by weight of polymer P1 and P2 is between 1-99% and 99-1%.

Advantageously, when said thermoplastic polymer is a mixture, and the pre-impregnation method uses a dry powder, this mixture assumes the form of a powder obtained by dry blend before introduction into the pre-impregnation tank or by dry blend carried out directly in the tank, or by grinding a compound made beforehand in an extruder.

Advantageously, this mixture is composed of a powder obtained by dry blend, before introduction into the tank or directly in the tank, and this mixture of two polymers P1 and P2 is a mixture of PEKK and PEI.

Advantageously, the PEKK/PEI mixture is from 90-10% to 60-40% by weight, in particular from 90-10% to 70-30% by weight.

The thermoplastic polymer can correspond to the final non-reactive polymer that will impregnate the fibrous material or to a reactive prepolymer, which will also impregnate the fibrous material, but which may react with itself or with another prepolymer, depending on the chain end carried by said prepolymer, after pre-impregnation, or with a chain extender and particularly during heating at a heating calendar in order to lead to said final non-reactive polymer, or also to a partially polymerized reactive thermoplastic prepolymer, optionally with said chain extender, and having a number-average molecular mass (Mn) ranging from 500 to 10,000, preferably from 4,000 to 8,000. Said partially polymerized reactive thermoplastic prepolymer is capable of leading to said non-reactive final polymer by heating depending on the Tg and/or Tm of the polymer used.

The expression "non-reactive polymer" means that the molecular weight is no longer likely to change significantly, that is, that its number-average molecular weight (Mn) changes by less than 50% when it is used and, therefore, corresponds to the final polyamide polymer of the thermoplastic matrix.

On the contrary, the expression "reactive polymer" means that the molecular weight of said reactive polymer will change during its implementation because of the reaction of reactive prepolymers together by condensation, substitution or with a chain extender by polyaddition and without the elimination of volatile by-products to lead to the final (non-reactive) polyamide polymer of the thermoplastic matrix.

According to a first possibility, said pre-polymer can comprise or be constituted of at least one carrier reactive pre-polymer (polyamide) on the same chain (that is to say, on the same pre-polymer), with two terminal functions X' and Y' that are respectively co-reactive functions relative to one another by condensation, more specifically with X' and Y' being amine and carboxy or carboxy and amine, respectively.

In this first possibility, said at least one reactive thermoplastic prepolymer may be partially polymerized, optionally with said chain extender, and has a number-average molecular weight (Mn) ranging from 500 to 10,000, preferably from 4,000 to 8,000.

According to a second possibility, said pre-polymer can comprise or be constituted of at least two polyamide pre-polymers that are reactive relative to one another and each respectively carry two identical terminal functions X' or Y' (identical for same pre-polymer and different between the two pre-polymers), said function X' of a pre-polymer being able to react only with said function Y' of the other pre-polymer, in particular by condensation, more specifically with X' and Y' being amine and carboxy or carboxy end amine, respectively.

In this second possibility, said at least one reactive thermoplastic prepolymer may be partially polymerized, optionally with the said chain extender, and has a number-average molecular weight (Mn) ranging from 500 to 10,000, preferably from 4,000 to 8,000.

According to a third possibility, said pre-polymer can comprise or be constituted of at least one pre-polymer of said thermoplastic polyamide polymer, carrying n terminal reactive functions X, selected from among: $-NH_2$, $-CO_2H$ and $-OH$, preferably $NH_2$ and $-CO_2H$ with n being 1 to 3, preferably from 1 to 2, more preferably 1 or 2, more particularly $\geq 2$ and at least one chain extender Y-A'-Y, with A' being a hydrocarbon bisubstituent, bearing 2 identical terminal reactive functions Y, reactive by polyaddition with at least one function X of said prepolymer a1), preferably having a molecular mass less than 500, more preferably less than 400.

In this second possibility, said at least one reactive thermoplastic prepolymer may be partially polymerized, optionally with said chain extender, and has a number-average molecular weight (Mn) ranging from 500 to 10,000, preferably from 4,000 to 8,000.

The number-average molecular weight Mn of said final polymer of the thermoplastic matrix is preferably in a range from 10000 to 40000, preferably from 12000 to 30000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

Said reactive prepolymers according to the two options given above, have a number-average molecular weight Mn ranging from 500 to 10000, preferably from 500 to 6000, in particular from 2500 to 6000.

The Mn are determined in particular by calculation from the rate of the terminal functions determined by potentiometric titration in solution and the functionality of said pre-polymers. The masses Mn can also be determined by steric exclusion chromatography or by NMR.

The nomenclature used to define the polyamides is described in ISO standard 1874-1:2011 "Plastiques—Matériaux polyamides (PA) pour moulage et extrusion—Partie 1: Designation", in particular on page 3 (Tables 1 and 2) and is well known to the person skilled in the art.

The polyamide can be a homopolyamide or a co-polyamide or a mixture thereof.

Advantageously, the pre-polymers constituting the matrix are selected from among polyamides (PA), in particular selected from among aliphatic polyamides, cycloaliphatic polyamides, and semi-aromatic polyamides (polyphthalamides) optionally modified by urea units, and copolymers thereof, polymethyl methacrylate (PPMA) and copolymers thereof, polyether imides (PEI), polyphenylene sulfide (PPS), polyphenylene sulfone (PPSU), PVDF, polyether ketone (PEKK), polyether either ketone (PEEK), fluorinated polymers such as polyvinylidene fluoride (PVDF).

Advantageously, PA6 is excluded from the definition of aliphatic polyamides. For the fluorinated polymers, it is possible to use a homopolymer of vinylidene fluoride (VDF with formula $CH_2=CF_2$) or a copolymer of VDF comprising, by weight, at least 50% by mass of VDF and at least one other monomer copolymerisable with VDF. The VDF content must be greater than 80% by mass, or better still 90% by mass, in order to ensure good mechanical and chemical resistance of the structural part, especially when it is subject to thermal and chemical stresses. The co-monomer must be a fluorinated monomer, for example vinyl fluoride.

For structural parts having to withstand high temperatures, aside from fluorinated polymers, according to the invention PAEK (polyaryletherketone) such as poly(ether ketones) PEK, poly(ether ketone) PEEK, poly(ether ketone ketone) PEKK, Poly(ether ketone ether ketone ketone) PEKEKK or PA with a high glass transition temperature Tg) are advantageously used.

Advantageously, said thermoplastic polymer is an amorphous polymer whose glass transition temperature is such that Tg$\geq$80° C., especially $\geq$100° C., particularly $\geq$120° C., more particularly $\geq$140° C., or a semi-crystalline polymer whose melting temperature Tm$\geq$150° C.

Advantageously, said at least one thermoplastic prepolymer is selected from among polyamides, PEKK, PEI and a mixture of PEKK and PEI.

Advantageously, said polyamide is selected from aliphatic polyamides, cycloaliphatic polyamides and semi-aromatic polyamides (polyphthalamides).

Advantageously, said aliphatic polyamide prepolymer is selected from:

polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), polyamide 11/1010 and polyamide 12/1010, or a mixture thereof or a copolyamide thereof, and the block copolymers, in particular polyamide/polyether (PEBA), and said semi-aromatic polyamide, is a semi-aromatic polyamide, optionally modified with urea units, in particular a PA MXD6 and a PA MXD10 or a semi-aromatic polyamide of formula X/YAr, as described in EP1505099, in particular a semi-aromatic polyamide of formula A/XT in which A is selected from a unit obtained from at least one amino acid, a unit obtained from at least one lactam and at least one unit corresponding to the formula (Ca diamine).(Cb diacid), with "a" representing the number of carbon atoms of the diamine and "b" representing the number of carbon atoms of the diacid, "a" and "b" each being between 4 and 36, advantageously between 9 and 18, the unit (Ca diamine) being selected from linear or branched aliphatic diamines, cycloaliphatic diamines and alkylaromatic diamines and the unit (Cb diacid) being selected from linear or branched aliphatic diacids, cycloaliphatic diacids and aromatic diacids; X.T denotes a unit obtained from the polycondensation of the Cx diamine and terephthalic acid, with x representing the number of carbon atoms of the Cx diamine, x being between 6 and 36, advantageously between 9 and 18, particularly a polyamide with formula A/6T, A/9T, A/10T or A/11T, A being as defined above, in particular a polyamide PA 6/6T, a PA 66/6T, a PA 6I/6T, a PA MPMDT/6T, a PA PA11/10T, a PA 11/6T/10T, a PA MXDT/10T, a PA MPMDT/10T, a PA BACT/10T, a PA BACT/6T, a PA 11/BACT, PA BACT/10T/6T.

T corresponds to terephthalic acid, MXD corresponds to m-xylylene diamine, MPMD corresponds to methylpentamethylene diamine and BAC corresponds to bis(aminomethyl)cyclohexane.

Advantageously, said aliphatic polyamide prepolymer is selected from:
polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), polyamide 11/1010 and polyamide 12/1010, or a mixture thereof or a copolyamide thereof, and the block copolymers, particularly polyamide/polyether (PEBA), and said semi-aromatic polyamide, is a semi-aromatic polyamide, optionally modified with urea units, particularly a PA MXD6 and a PA MXD10 or a semi-aromatic polyamide of formula X/YAr, as described in EP1505099, particularly a semi-aromatic polyamide of formula A/XT in which A is selected from a unit obtained from at least one amino acid, a unit obtained from at least one lactam and at least one unit corresponding to the formula (Ca diamine).(Cb diacid), with "a" representing the number of carbon atoms of the diamine and "b" representing the number of carbon atoms of the diacid, "a" and "b" each being between 4 and 36, advantageously between 9 and 18, the unit (Ca diamine) being selected from linear or branched aliphatic diamines, cycloaliphatic diamines and alkylaromatic diamines and the unit (Cb diacid) being selected from linear or branched aliphatic diacids, cycloaliphatic diacids and aromatic diacids; X.T denotes a unit obtained from the polycondensation of the Cx diamine and terephthalic acid, with x representing the number of carbon atoms of the Cx diamine, x being between 6 and 36, advantageously between 9 and 18, particularly a polyamide with formula A/6T, A/9T, A/10T or A/11T, A being as defined above, in particular a polyamide PA 6/6T, a PA 66/6T, a PA 6I/6T, a PA MPMDT/6T, a PA PA11/10T, a PA 11/6T/10T, a PA MXDT/10T, a PA MPMDT/10T, a PA BACT/10T, a PA BACT/6T, a PA 11/BACT, PA BACT/10T/6T.

T corresponds to terephthalic acid, MXD corresponds to m-xylylene diamine, MPMD corresponds to methylpentamethylene diamine and BAC corresponds to bis(aminomethyl)cyclohexane.

Advantageously, said polyamide is a semi-aromatic polyamide selected from a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T.

Fibrous Material:

Concerning the fibers constituting said fibrous material, they are notably continuous fibers of mineral, organic or plant origin in the form of rovings.

Advantageously, the number of fibers in said fibrous material for carbon fibers is greater than or equal to 3K, in particular greater than or equal to 6K, particularly greater than or equal to 12K.

Advantageously, the number of fibers in said fibrous material is for carbon fibers greater than or equal to 12K, in particular selected from 12K, 24K, 48K, 50K and 400K, particularly ≥12K, 24K, 48 and 50K.

Advantageously, the grammage for the glass fiber is greater than or equal to 1,200 Tex, in particular greater than or equal to 2,400 Tex, greater than or equal to 4,800 Tex.

The mineral fibers include carbon fibers, glass fibers, basalt or basalt-based fibers, silica fibers, or silicon carbide fibers, for example. The organic fibers include thermoplastic or thermosetting polymer-based fibers, such as semi-aromatic polyamide fibers, aramid fibers or polyolefin fibers, for example. Preferably, they are amorphous thermoplastic polymer-based and have a glass transition temperature Tg higher than the Tg of the polymer or thermoplastic polymer mixture constituting the pre-impregnation matrix when the latter is amorphous, or higher than the Tm of the polymer or thermoplastic polymer matrix constituting the pre-impregnation matrix when the latter is semi-crystalline. Advantageously, they are semi-crystalline thermoplastic polymer-based and have a melting temperature Tm higher than the Tg of the polymer or thermoplastic polymer mixture constituting the pre-impregnation matrix when the latter is amorphous, or higher than the Tm of the polymer or thermoplastic polymer matrix constituting the pre-impregnation matrix when the latter is semi-crystalline. Thus, there is no melting risk for the organic fibers making up constituting the fibrous material during the impregnation by the thermoplastic matrix of the final composite. The plant fibers include natural linen, hemp, lignin, bamboo, silk, in particular spider silk, sisal, and other cellulose fibers, in particular viscose. These plant fibers can be used pure, treated or coated with a coating layer, in order to facilitate the adherence and impregnation of the thermoplastic polymer matrix.

It can also correspond to fibers with support threads.

These component fibers can be used alone or in mixtures. Thus, organic fibers can be mixed with the mineral fibers to be pre-impregnated with thermoplastic polymer and to form the pre-impregnated fibrous material.

The organic fiber rovings can have several grammages. They can further have several geometries.

Preferably, the fibrous material is composed of continuous carbon, glass or silicon carbide fibers or mixture thereof, in particular carbon fibers. It is used in the form of a roving or several rovings, which then consist of a single roving having the addition of the fibers of each roving.

In the impregnated materials, also called "ready to use", the polymer or mixture of thermoplastic impregnation polymers is distributed uniformly and homogeneously around the fibers. In this type of material, the thermoplastic impregnation polymer must be distributed as homogeneously as possible within the fibers in order to obtain minimal porosities, that is to say, minimal empty spaces between the fibers. Indeed, the presence of porosities in this type of material can act as stress concentration spots, during mechanical tensile stressing, for example, and which then form crack initiation points of the impregnated fibrous material and mechanically compromise it. A homogeneous distribution of the polymer or mixture of polymers therefore improves the mechanical strength and homogeneity of the composite material formed from these impregnated fibrous materials.

Thus, in the case of so-called "ready to use" impregnated materials, the fiber content in said pre-impregnated fibrous material is between 45 to 65% by volume, preferably from 50 to 60% by volume, particularly from 54 to 60% by volume.

The impregnation rate can be measured by image analysis (using a microscope or photo or digital camera device, for example), of a cross-section of the ribbon, by dividing the surface area of the ribbon impregnated by the polymer by the total surface area of the product (impregnated surface plus surface of the porosities). In order to obtain a good quality image, it is preferable to coat the ribbon cut in its transverse direction with a standard polishing resin and to polish with a standard protocol allowing the observation of the sample under a microscope with at least 6× magnification.

Advantageously, the porosity level of said impregnated fibrous material is less than 10%, in particular less than 5%, particularly less than 2%.

It must be noted that a nil porosity level is difficult to achieve and that as a result, advantageously the porosity level is greater than 0% but less than the levels cited above.

The porosity level corresponds to the closed porosity level and can be determined either by electron microscopy, or as being the relative deviation between the theoretical density and the experimental density of said impregnated fibrous material as described in the examples section of the present invention.

According to another aspect, the present invention relates to a method for preparing an impregnated fibrous material, as defined above, characterized in that it comprises a step of heating the pre-impregnated fibrous material and of finalizing the impregnation by means of at least one heating system provided with at least one supporting part (E) and optionally a step of shaping and calibrating the roving or said parallel rovings of an impregnated fibrous material.

Advantageously, the shaping and calibration step is preceded by said step of heating the pre-impregnated fibrous material and of finalizing the impregnation.

In one embodiment, the step of heating a pre-impregnated fibrous material and finalizing the impregnation is carried out with the same heating system.

In another embodiment, the step of heating a pre-impregnated fibrous material and finalizing the impregnation is carried out with two separate heating systems.

Advantageously, the step of heating a pre-impregnated fibrous material and of finalizing the impregnation is preceded by a step of pre-impregnating the fibrous material.

Advantageously, the method of the invention comprises the following steps:
i) Pre-impregnating a fibrous material particularly by powder deposition, by molten route, particularly by pultrusion, by cross-head extrusion of molten polymer, by continuous passage of the fibers in an aqueous polymer powder dispersion or aqueous polymer particle dispersion or aqueous polymer emulsion or suspension, by fluidized bed, equipped or not with at least one supporter (E'), by spraying by nozzle or spray gun by dry route in a tank equipped or not equipped with at least one supporter (E') in order to obtain a pre-impregnated fibrous material,
ii) the step of heating said pre-impregnated fibrous material and finalizing the impregnation to obtain an impregnated fibrous material consisting of a tape in the form of a strip having an average thickness of less than or equal to 100 μm, in particular between 10 μm and 100 μm,
iii) optionally the step of shaping and calibrating the roving or said parallel rovings of said impregnated fibrous material to obtain an impregnated fibrous material consisting of a tape in the form of a calibrated thin tape having an average thickness of less than or equal to 100 μm, in particular between 10 μm and 100 μm.

Advantageously, the method of the invention is carried out at a speed of at least 10 m/min, in particular of at least 20 m/min, particularly of at least 30 m/min.

Method for Preparing Impregnated Fibrous Material in the Form of Strip or Thin Tape The impregnated fibrous material in the form of strip, particularly a single-layer material, can be prepared in two steps:
A first step of pre-impregnation by a polymer matrix and a second step of heating for finalizing the impregnation by means of at least one supporting part (E) and at least one heating system.

The impregnated fibrous material in the form of thin tape, particularly a single-layer material, can be prepared in three steps:
A first step of pre-impregnation by a polymer matrix, a second step of heating for finalizing the impregnation by means of at least one supporting part (E) and at least one heating system, and a third step of shaping and calibration.

First Step: Pre-Impregnation

The first step of pre-impregnation to produce a pre-impregnated fibrous material can be carried out according to techniques well known to the person skilled in the art and particularly selected from those disclosed above.

Thus they can be carried out by a preimpregnation technology by powder deposition, by molten route, in particular by pultrusion, by cross-head extrusion of molten polymer, by continuous passage of the fibers in an aqueous polymer powder dispersion or aqueous polymer particle dispersion or aqueous polymer emulsion or suspension, by fluidized bed, equipped or not with at least one supporter (E'), by spraying by nozzle or spray gun by dry route in a tank equipped or not equipped with at least one supporter (E').

The supporter can be a concave, convex or cylindrical compression roller, in particular it is cylindrical.

Figure 2:
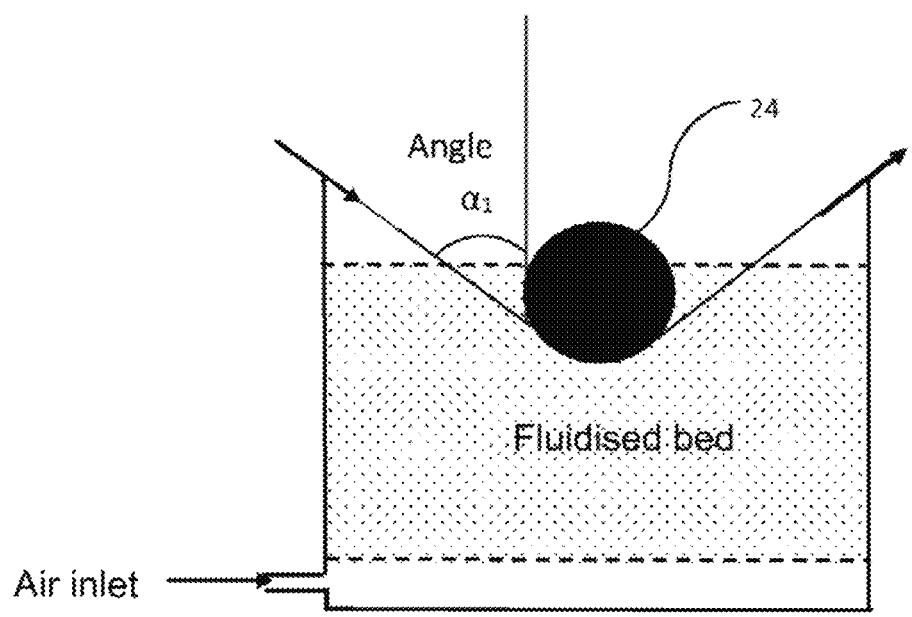
FIG. 2 shows an example of a tank comprising a fluidized bed in which the supporter is a cylindrical compression roller.

FIG. 1 shows an example of a tank provided with a supporter and FIG. 2 shows an example of a tank comprising a fluidized bed in which the supporter is a cylindrical compression roller.

The same tank can be used without a fluidized bed present and equipped with a spray gun.

The preimpregnation can also be carried out with the system such as defined above in which one or more supporter(s) (E'') is (are) present upstream from said system, in particular before the tank in which the preimpregnation is carried out.

It should be noted that the supporting parts (E) and (E'') can be identical or different whether in terms of the material or shape and its characteristics (diameter, length, width, height, etc. as a function of the shape).

Molten Route:

The preimpregnation step can be carried out by molten route, in particular by pultrusion.

Pre-impregnation techniques by molten route are known by those skilled in the art and are described in the references above.

The preimpregnation step is carried out in particular by cross-head extrusion of the polymer matrix and passage of said roving or rovings in this crosshead and then passage in the heated die, where the crosshead could be provided with fixed or rotating supporters on which the roving passes thus causing a spreading of said roving allowing a preimpregnation of said roving.

The pre-impregnation can in particular be carried out as described in US 2014/0005331A1, with the difference that the resin supply is carried out on two sides of said roving and there is no contact surface eliminating a portion of the resin on one of the two surfaces.

Advantageously, the pre-impregnation step is carried out by molten route at a high speed, that is, with a passage speed of said roving(s) of at least 10 m/min, in particular of at least 20 m/min, particularly of at least 30 m/min.

Fluidized Bed:

The preimpregnation step can be carried out in fluidized bed.

An example unit for carrying out a manufacturing method without the heating step using at least one supporting part is described in international application WO 2015/121583.

This system describes the use of a tank comprising a fluidized bed for performing the pre-impregnation step and can be used in the context of the invention.

Advantageously, the tank comprising the fluidized bed is provided with at least one supporting part (E') (FIG. 1) which can be a compression roller (FIG. 2).

Supporting part (E') must be understood to mean any system on which the roving has the possibility of traveling in the tank. The supporting part (E') can have any shape as long as the roving can pass over it.

An example of supporting part (E'), without restricting the invention thereto, is disclosed in detail in FIG. 1.

It should be noted that the supporting parts (E) and (E') can be identical or different whether in terms of the material or shape and its characteristics (diameter, length, width, height, etc. as a function of the shape).

However, the supporting part (E') is not heating or heated.

The step for pre-impregnation of the fibrous material is carried out by passage of one or more rovings in a continuous pre-impregnation device, comprising a tank (10) provided with at least one supporting part (E') and comprising a fluidized powder bed (12) of said polymer matrix.

The powder of said polymer matrix or polymer is suspended in a gas G (air, for example) introduced into the tank and circulating in the tank (10) through a hopper (11). The roving(s) are circulated in this fluidized bed (12).

The tank can have any shape, in particular cylindrical or parallelepiped, particularly a rectangular parallelepiped or a cube, advantageously a rectangular parallelepiped.

The tank (10) can be an open or closed tank.

In the event the tank is closed, it is then equipped with a sealing system so that the powder of said polymer matrix cannot leave said tank.

This pre-impregnation step is therefore carried out by a dry route, that is to say, the thermoplastic polymer matrix is in powder form, in particular suspended in a gas, particularly air, but cannot be dispersed in a solvent or water.

Each roving to be pre-impregnated is unwound from a device with reels under the traction created by cylinders (not shown).

Each reel is provided with a brake (not shown) so as to apply tension on each fiber roving. In this case, an alignment module makes it possible to position the fiber rovings parallel to one another. In this way, the fiber rovings cannot be in contact with one another, which makes it possible to avoid mechanical damage to the fibers by friction relative to one another.

The fiber roving or the parallel fiber rovings then enter a tank (10), in particular comprising a fluidized bed (12), provided with a supporting part (E') that is a compression roller (24) in the case of FIG. 2. The fiber roving or the parallel fiber rovings next leave(s) the tank after pre-impregnation after optionally checking the residence time in the powder.

The expression "residence time in the powder" means the time during which the roving is in contact with said powder in the fluidized bed.

If the fibrous material, such as the glass or carbon fiber rovings, has a sizing, an optional step of de-sizing can be carried out before the fibrous material passes into the tank.

Advantageously, the tank used comprises a fluidized bed with a supporter and said preimpregnation step is carried out with a simultaneous spreading of said roving or rovings between the entry to and exit from the tank comprising said fluidized bed.

The expression "inlet of the tank" corresponds to the vertical tangent of the edge of the tank that comprises the fluidized bed.

The expression "outlet of the tank" corresponds to the vertical tangent of the other edge of the tank that comprises the fluidized bed.

The spreading consists of isolating each fiber constituting said roving as much as possible from the other fibers which surround it in the space closest thereto. It corresponds to the transverse spreading of the roving.

In other words, the transverse separation or the width of the roving increases between the entry to the tank comprising the fluidized bed and the exit from the tank comprising the fluidized bed and thus makes an improved preimpregnation of the fibrous material possible.

The use of at least one supporter (E'), in particular a cylindrical compression roller, in the preimpregnation step, therefore makes an improved preimpregnation possible compared to the methods from the prior art.

The expression "compression roller" means that the roving that passes bears partially or wholly on the surface of said compression roller, which causes the spreading of said roving.

Advantageously, said at least one compression roller is cylindrical and the spreading percentage of said roving(s) between the inlet and the outlet of the tank of said fluidized bed is between 1% and 1000%, preferably from 100% to 800%, preferably from 200% to 800%, preferably from 400% to 800%.

The percentage of spreading is equal to the ratio of the final width of the roving to the initial width of the roving multiplied by 100.

The diameter of said at least one compression roller is from 3 mm to 500 mm, preferably from 10 mm to 100 mm, in particular from 20 mm to 60 mm.

Below 3 mm, the deformation of the fiber caused by the compression roller is too great.

Advantageously, the compression roller is cylindrical and not ribbed, and is in particular metallic.

When the supporting part (E') is at least one compression roller, according to a first variant, a single compression roller is present in the fluidized bed and said pre-impregnation is carried out at the angle $\alpha_1$ formed by said roving(s) between the inlet of said compression roller and the vertical tangent at said compression roller.

The angle $\alpha_1$ formed by said roving(s) between the inlet of said compression roller and the vertical tangent to said compression roller allows the formation of an area in which the powder will concentrate, thus leading to a "corner effect" that, with the simultaneous spreading of the roving by said compression roller, allows a pre-impregnation over a greater roving width and therefore an improved pre-impregnation compared to the techniques of the improved background art.

Throughout the description, all of the provided angle values are expressed in absolute values.

Advantageously, the angle $\alpha_1$ is comprised from 0 to 89°, preferably 5° to 85°, preferably 5° to 45° and preferably 5° to 30°.

Nevertheless, an angle $\alpha_1$ comprised from 0 to 5° is likely to give rise to risks of mechanical stress, which will lead to breakage of fibers and an angle $\alpha_1$ comprised from 85° to 89° does not create sufficient mechanical force for creating "the corner effect."

A value of the angle $\alpha_1$ equal to 0° therefore corresponds to a vertical fiber. It is clear that the height of the cylindrical compression roller is adjustable, thus making it possible to position the fiber vertically.

Advantageously, the inlet edge of the tank (23a) is equipped with a roller, in particular cylindrical and rotating, on which said roving(s) pass(es), thus leading to spreading prior to the pre-impregnation.

It is clear that the "corner effect" caused by the angle $\alpha_1$ favours the pre-impregnation on one face, but the spreading of said roving obtained owing to the compression roller also makes it possible to have pre-impregnation on the other face of said roving. In other words, said pre-impregnation is enhanced on one surface of said roving or rovings near the angle $\alpha_1$ formed by said roving or rovings between the entry to said at least one compression roller $R_1$ and the vertical tangent to the compression roller $R_1$ but the spreading also makes pre-impregnation of the other surface possible.

The angle $\alpha_1$ is as defined above.

Advantageously, the volume diameter D90 of the particles of thermoplastic polymer powder is from 30 to 500 μm, advantageously from 80 to 300 μm.

Advantageously, the volume diameter D10 of the particles of thermoplastic polymer powder is from 5 to 200 μm, advantageously from 15 to 100 μm.

Advantageously, the volume diameter of the particles of thermoplastic polymer powder is in the ratio D90/D10, or from 1.5 to 50, advantageously from 2 to 10.

Advantageously, the average volume diameter D50 of the particles of thermoplastic polymer powder is from 10 to 300 μm, in particular from 30 to 200 μm, more particularly from 45 to 200 μm.

The volume diameters of the particles (D10, D50 and D90) are defined according to standard ISO 9276:2014.

"D50" corresponds to the average diameter by volume, that is to say, the value of the particle size that divides the examined population of particles exactly in half.

"D90" corresponds to the value at 90% of the cumulative curve of the particle size distribution by volume.

"D10" corresponds to the size of 10% of the volume of the particles.

According to other variants, two, three or more rollers can be present in the fluidized bed.

Spraying by Spray Gun:

The step of preimpregnation of the fibrous material can also be carried out by sending one or more rovings into a device for continuous preimpregnation by spraying that comprises a tank comprising one or more nozzle(s) or one or more gun(s) spraying the polymer powder on the fibrous material at the roller entry.

The powder from polymer or polymer(s) is sprayed on said fibrous material in the tank by means of nozzle(s) or spray gun(s) near the supporting part notably of the compression roller (on entry). The roving(s) are circulated in this tank.

Figure 3:
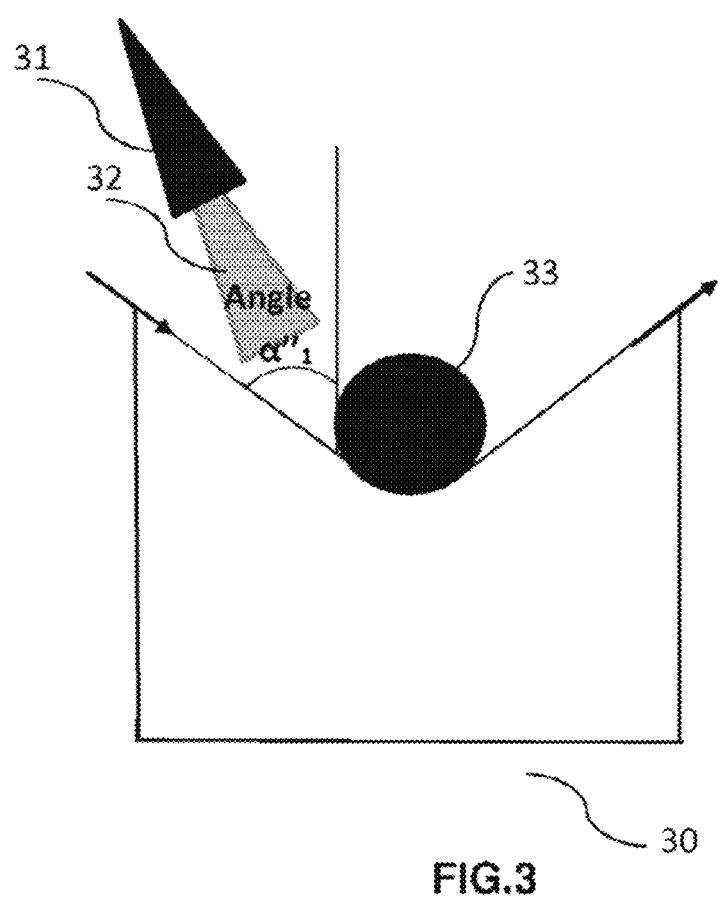
FIG. 3 shows an example with a spray gun.

An example with a spray gun is shown in FIG. 3, without being limited thereto.

All the characteristics of the supporters, and in particular the compression rollers, the spreading, and the angle $\alpha_1$ causing the corner effect and detailed for the fluidized bed are also valid for spraying by spray gun.

According to other variants, two, three or more rollers can be present each having a spray gun.

In one embodiment, the pre-impregnation is carried out by powder deposition, by continuous passage of the fibers in an aqueous polymer powder dispersion or aqueous polymer particle dispersion or aqueous polymer emulsion or suspension, by fluidized bed, equipped or not with at least one supporter (E'), by spraying by nozzle or spray gun by dry route in a tank equipped or not equipped with at least one supporter (E').

In another embodiment, the pre-impregnation is carried out by continuous passage of the fibers in an aqueous polymer powder dispersion or aqueous polymer particle dispersion or aqueous polymer emulsion or suspension, by fluidized bed, equipped or not with at least one supporter (E'), by spraying by nozzle or spray gun by dry route in a tank equipped or not equipped with at least one supporter (E').

Second step: heating the pre-impregnated fibrous material and finalizing the impregnation.

The step of preimpregnation can therefore be carried out by any means provided or not with at least one supporter (E').

The presence of the supporter allows the spreading of the roving and improves the preimpregnation. However, the presence of this supporter is not indispensable as long as a heating system provided with at least one supporting part (E) is present after the pre-impregnation step to finalize the impregnation.

The expression "supporting part (E)" refers to any system on which the roving can pass. The supporting part (E) can have any shape as long as the roving can pass over it. It can be stationary or rotating.

Advantageously, the heating calendar is excluded from the definition of supporting part (E).

The heating system is any system giving off heat or emitting radiation capable of heating the supporting part (E).

It can be selected from an infrared lamp, a UV lamp, convection heating, microwave heating, laser heating and High Frequency (HF) heating.

The supporting part (E) is therefore conductive or absorbs the radiation emitted by the heat.

The expression "heat-conducting supporting part (E)" means that the supporting part (E) is composed of a material capable of absorbing and conducting heat.

It can also be a heating system using high frequency waves, microwaves or laser.

In this case, the supporting part does not conduct heat or does not absorb the radiation emitted by the heat.

The expression "non-heat-conducting supporting part (E)" means that the supporting part (E) is composed of material incapable of absorbing and conducting heat.

Said at least one supporting part (E) is located or comprised in the environment of the heating system, that is to say, it is not outside the heating system.

Advantageously, said heating system is mounted over said at least one supporting part (E). The heating system has a level sufficient so that the polymer present on the roving can melt but without breaking down said polymer.

Nevertheless, said heating system comprises either only said at least one supporting part (E), or may also comprise a portion of the roving, outside said supporting system (E), said roving portion being located before and/or after said supporting system (E).

Figure 4:
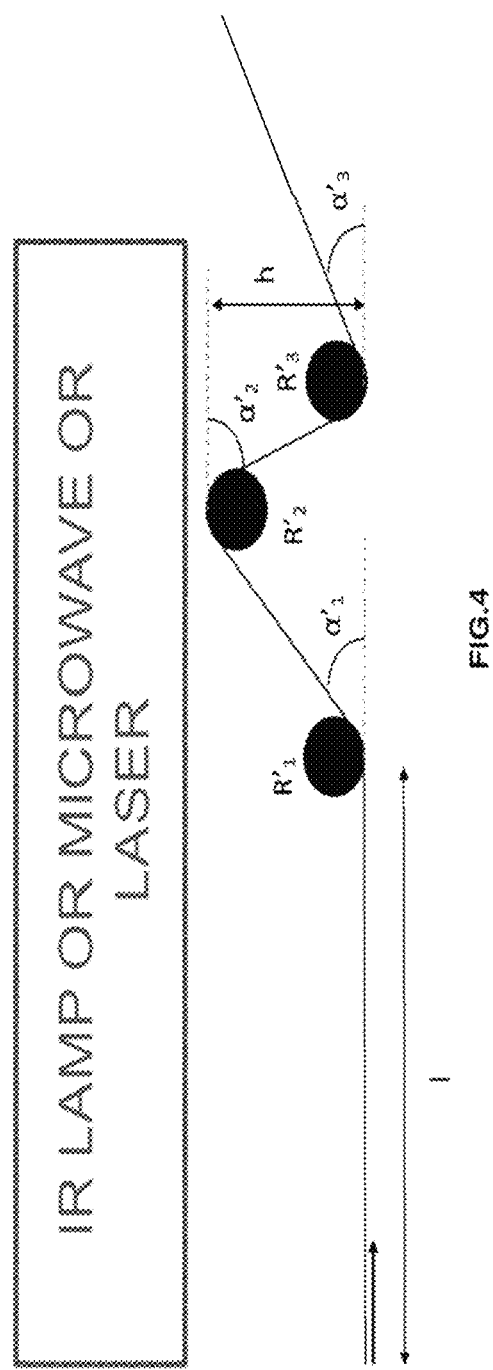
FIG. 4 shows an illustration of a heating system and of three supporters (E).

An illustration of a heating system and of three supporters (E), corresponding to $R'_1$, $R'_2$ and $R'_3$, is shown in FIG. 4, but is in no way limited thereto.

It is obvious that a second heating system can be present below the supporters, thus allowing uniform melting of said polymer on the two surfaces of the roving.

The heating system shown in FIG. 4 is a horizontal system. However, the heating system(s) can be positioned vertically also with vertical passage of the roving through the supporters.

As a result, this heating step makes it possible to perfect the impregnation of the roving carried out beforehand during the pre-impregnation step, and in particular to obtain a homogeneous impregnation to the core.

Effectively, whatever the system used for the preimpregnation step, a first spreading occurs during that step, in particular if the preimpregnation step is carried out with the use of supporting parts (E'), such as in a fluidized bed with at least one supporter as described above.

A first spreading of the roving occurs at said compression rollers corresponding to the supporting parts (E') with "corner effect" due to the partial or complete passage of said roving over said supporting part(s) (E') and a second spreading occurs during the heating step, at said compression rollers corresponding to the supporting parts (E) due to the partial or complete passage of said roving over said supporting part(s) (E).

The heating system can be divided into two and therefore consists of two heating systems, a first heating system before said supporting parts (E) and a second heating system comprising said supporting parts. It is quite obvious that the distance between the two heating systems is then sufficient for the polymer to remain in the molten state.

The two heating systems may be of the same nature or of different nature and of identical or different power.

This second spreading is preceded during the passage of the roving in the heating system, before partial or full passage thereof over said supporter(s) (E), by the shrinkage of the roving because of the melting of the polymer on said roving.

This second spreading combined with the melting of said polymer matrix by the heating system and the retraction of the roving, make it possible to homogenize the pre-impregnation and thus to finalize the impregnation and to thus have an impregnation to the core and to have a high fiber content by volume, particularly constant in at least 70% of the volume of the tape, particularly in at least 80% of the volume of the tape, in particular in at least 90% of the volume of the tape, more particularly in at least 95% of the volume of the tape, as well as to decrease the porosity.

A roving of width $I_1$ before pre-impregnation therefore has a width $I_2 > I_1$ after pre-impregnation and a width $I_3 < I_2 > I_1$ after melting the polymer and shrinking said fibrous material pre-impregnated with said molten polymer.

After passing over the supporting part(s), the second expansion of the fibrous material comprising said molten polymer leads to a material having an average width $I_4$ approximately equal to $I_2$ and having an average thickness $e_4$ of less than or equal to 100 µm.

The impregnated fibrous material then constitutes a tape in the form of a strip of uncalibrated average width but of average thickness less than or equal to 100 µm.

Advantageously, the spreading percentage during the heating step between the inlet of the first compression roller $R'_1$ and the outlet of the last compression roller $R'_i$ is about 0 to 300%, in particular 0 to 50%.

The various spreadings during the heating step combined with the melting of the thermoplastic polymer and the shrinkage of the roving during said heating step make it possible to produce an impregnated fiber content after the heating step between 45% to 65% by volume, preferably from 50 to 60% by volume, particularly from 54 to 60% (fiber content which cannot be reached by conventional techniques by molten route), where the fiber content by volume and the distribution of fibers is substantially identical on average on either side of the median plane of the fibrous material over the full length of said fibrous material thus leading to obtaining a notably single-layer fibrous material.

Below 45% fibers, the reinforcement is not of interest regarding the mechanical properties.

Above 65%, the limitations of the method are reached and the mechanical properties are lost again.

It is quite obvious that the average thickness $e_4$ depends on the content of impregnated fibers, the average thickness being particularly less than or equal to 100 µm for a content of impregnated fibers of between 45 and 65% by volume.

Advantageously, the porosity level in said impregnated fibrous material is less than 10%, in particular less than 5%, particularly less than 2%.

Shaping and Calibrating Step: Obtaining the Thin Tape

A step of shaping the roving or said parallel rovings and of calibrating said impregnated fibrous material is carried out after leaving the second heating system.

This step can be carried out directly after leaving the second heating system and, in this case, the running speed of the roving is identical in the second and third heating systems or is delayed, which means that the running speed of the roving can be different between the second and third heating systems.

This step can be carried out according to one of the following embodiments:

1) passing a strip over one or more supporters (as defined for (E)) of which at least one supporter is notched (grooved), the average width of said strip being less than the notched (or grooved) supporter.

At least one of said supporters is located under a third heating system, particularly IR, microwave, high frequency or laser heating system, in particular IR heating system with a power (for each tape or stack of parallel tapes) of between 0.1 W and 10 kW, more preferably between 0.1 and 6 kW, more preferably between 0.1 and 3 kW, even more preferably between 0.6 and 3 kW, even more preferably between 0.6 and 1.8 kW. Advantageously, said at least one notched roller (41) is located first and is outside the third heating system (45). Advantageously, a second notched supporter (44) is present at the exit and outside the third heating system.

The passage over the non-notched supporters (42) and (43) makes it possible to re-expand the strip to the width of the notched supporter.

The diameter of the notched supporter or supporters (41) and (44) is between 12 mm and 50 mm, in particular between 12 mm and 30 mm.

The diameter of the non-notched supporter or supporters (42) and (43) is between 10 mm and 50 mm, in particular between 10 mm and 30 mm.

After passing under the third heating system, the strip, shaped to the width of the notched supporter at the exit of the third heating system, passes at the level of the heating calenders (46) mounted in series and equipped with an IR system of 1 kW each and whose power delivered is variable, outside the third heating system, to obtain the thin tape of less than 100 µm thickness. In the case of calibration at a width of 12.7 mm, the theoretical thickness of the tape will be 66 µm for a fiber content of 55% by volume and 61 µm for a fiber content of 60% by volume.

Figure 7:
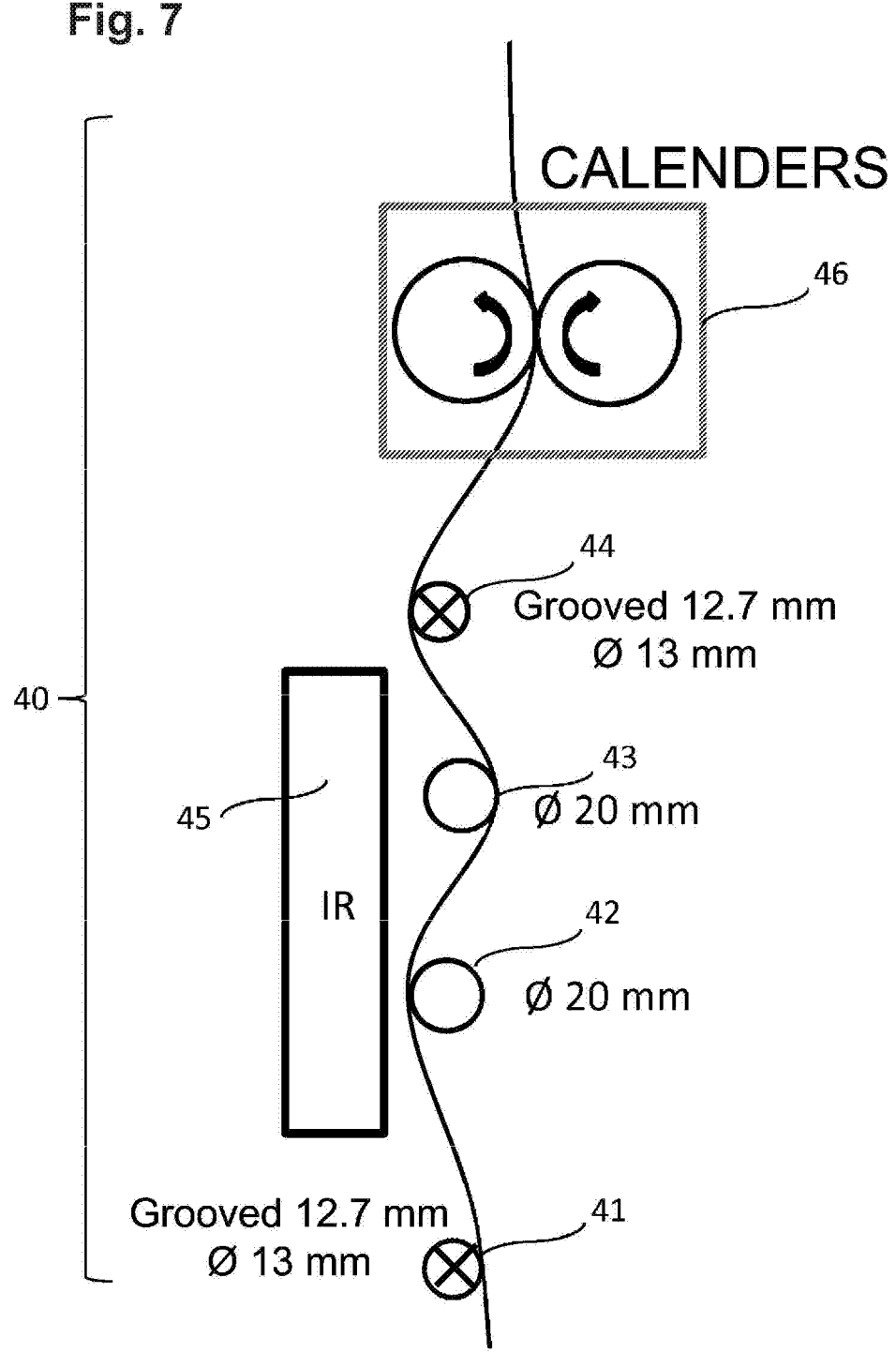
FIG. 7 shows an embodiment of the step of shaping and calibrating the strip (obtained in FIG. 6) at 12.7 mm to obtain the thin tape at 12.7 mm.

FIG. 7 discloses an exemplary embodiment without being limited thereto.

The supporters are shown in FIG. 7 at the same level but they can be as in the second heating system at different heights. The notched supporters may also have the same or a different diameter as the non-notched supporters.

2) passing a strip over one or more supporters (as defined for (E)) of which at least one supporter is notched (grooved), the average width of said strip being greater than the notched (or grooved) supporter.

Said supporters are located under a third heating system, particularly IR, microwave, high frequency or laser heating system, in particular IR heating system with a power (for each tape or stack of parallel tapes) of between 0.1 W and 10 kW, more preferably between 0.1 and 6 kW, more preferably between 0.1 and 3 kW, even more preferably between 0.6 and 3 kW, even more preferably between 0.6 and 1.8 kW.

Advantageously, said at least one notched roller is located first.

The passage over the first notched supporter makes it possible to reduce the width of the strip below the width of the notched groove. Advantageously, a second notched supporter is present at the exit and outside the third heating system with a groove of width greater than the width of the strip.

After passing under the third heating system, the strip is shaped to the width of the notched supporter at the exit of the third heating system, passes at the level of heating calenders mounted in series and equipped with an IR system of 1 kW, outside the third heating system, to obtain the thin tape of less than 100 μm thickness.

In the case of calibration at a width of 12.7 mm, the theoretical thickness of the tape will be 66 μm for a fiber content of 55% by volume and 61 μm for a fiber content of 60% by volume.

A calendering system with pressure and roll gap managed as disclosed in WO 2015/121583 can be used in both embodiments.

The supporter is in particular a fixed or rotary notched roller, or even a counter-rotating roller, in particular a fixed roller for gathering the said impregnated fibrous material to the right width.

The notched roller may also have rounded edges at the lateral contact points with the supporter to avoid damaging the fibers at the edge of the thin tape.

The expression "rounded edges" means that the bottom of the notch is concave or convex in shape.

The fibrous material impregnated after passing over the calendar system then consists of a tape in the form of a thin tape having a final average width of less than $I_4$.

Advantageously, the first embodiment of the shaping and calibrating step is preferred.

Said thin tape has an average thickness of less than or equal to 100 μm for a content of impregnated fibers of between 45 and 65% by volume.

Advantageously, said thin tape has a final average width of less than $I_4$ and an average thickness of between 10 μm and 100 μm for a content of impregnated fibers of between 45 and 65% by volume.

This therefore makes it possible to work with high travel speeds and thus reduce the production costs.

Advantageously, the method according to the invention is carried out at a speed of at least 10 m/min, in particular of at least 20 m/min, particularly of at least 30 m/min.

According to another aspect, the present invention relates to the use of an impregnated fibrous material, as defined above, for the preparation of thermoformable sheets.

Thermoforming is carried out beyond the Tg for an amorphous thermoplastic polymer or between Tg and Tm for a semi-crystalline thermoplastic polymer, but it can also be carried out beyond the Tm for a semi-crystalline thermoplastic polymer.

The impregnated fibrous material is pre-slit into pieces having a width equal to the initial width of said fibrous material and a length of between 5 and 50 mm, in particular between 20 and 30 mm, said pieces being randomly associated or oriented for the preparation of the thermoformable sheet.

The fibrous material may be either a strip or a thin tape.

Advantageous Embodiments of the Inventive Method

Advantageously, the fibrous material is selected from carbon fiber rovings in particular greater than or equal to 12K, in particular selected from 12K, 24K, 48, 50K and 400K, particularly 12K, 24K, 48 and 50K, and glass fiber in particular whose grammage is greater than or equal to 1,200 Tex, particularly greater than or equal to 2,400 Tex, greater than or equal to 4,800 Tex.

Advantageously, the thermoplastic prepolymer used to impregnate the carbon fiber is selected from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK, PEEK and a PEI, or a mixture thereof.

Advantageously, the thermoplastic prepolymer used for impregnating the glass fiber is selected from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK, a PEEK and a PEI, or a mixture thereof.

Advantageously, the fibrous material comprises carbon fiber rovings greater than or equal to 12K, in particular selected from 12K, 24K, 48, 50K and 400K, particularly ≥12K, 24K, 48 and 50K, and the thermoplastic polymer used for pre-impregnating the carbon fiber is selected from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK, a PEEK and a PEI, or a mixture thereof.

Advantageously, the fibrous material is composed of carbon fiber rovings greater than or equal to 12K, in particular selected from 12K, 24K, 48, 50K and 400K, particularly ≥12K, 24K, 48 and 50K, and the thermoplastic polymer used for pre-impregnating the carbon fiber is selected from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/

10T/6T, a PA 11/BACT/6T, PA 11/MPMDT/10T, PA 11/BACT/10T, a PA 11/MXDT/10T, a PEKK, a PEEK and a PEI, or a mixture thereof.

Advantageously, the fibrous material comprises glass fiber rovings whose grammage is greater than or equal to 1,200 Tex, particularly greater than or equal to 2,400 Tex, greater than or equal to 4,800 Tex, and the thermoplastic polymer used for pre-impregnating the glass fiber is selected from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK, a PEEK and a PE, or a mixture thereof.

Advantageously, the fibrous material is composed of glass fiber rovings whose grammage is greater than or equal to 1,200 Tex, particularly greater than or equal to 2,400 Tex, greater than or equal to 4,800 Tex and the thermoplastic polymer used for pre-impregnating the glass fiber is selected from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK, a PEEK and a PEI, or a mixture thereof.

Advantageously, the fibrous material comprises carbon fiber rovings greater than or equal to 12K, in particular selected from 12K, 24K, 48, 50K and 400K, particularly ≥12K, 24K, 48 and 50K, and the thermoplastic polymer used for pre-impregnating the carbon fiber is selected from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK, or a mixture thereof, and the Tg of said thermoplastic polymer is ≥80° C., especially ≥100° C., particularly ≥120° C., more particularly ≥140° C. or the Tm is ≥150° C.

Advantageously, the fibrous material consists of carbon fiber rovings greater than or equal to 12K, in particular selected from 12K, 24K, 48, 50K and 400K, particularly ≥12K, 24K, 48 and 50K, and the thermoplastic polymer used for pre-impregnating the carbon fiber is selected from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK, or a mixture thereof, and the Tg of said thermoplastic polymer is ≥80° C., especially ≥100° C., particularly 120° C., more particularly ≥140° C. or the Tm is ≥150° C.

Advantageously, the fibrous material comprises glass fiber rovings whose grammage is greater than or equal to 1,200 Tex, particularly greater than or equal to 2,400 Tex, greater than or equal to 4,800 Tex and the thermoplastic polymer used for pre-impregnating the glass fiber is selected from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK, a PEEK and a PEI, or a mixture thereof, and the Tg of said thermoplastic polymer is ≥80° C., especially ≥100° C., particularly ≥120° C., more particularly ≥140° C. or the Tm is ≥150° C.

Advantageously, the fibrous material consists of glass fiber rovings whose grammage is greater than or equal to 1,200 Tex, particularly greater than or equal to 2,400 Tex, greater than or equal to 4,800 Tex and the thermoplastic polymer used for pre-impregnating the glass fiber is selected from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK and a PEI, or a mixture thereof, and the Tg of said thermoplastic polymer is ≥80° C., especially ≥100° C., particularly ≥120° C., more particularly ≥140° C. or the Tm is ≥150° C.

FIG. 1 describes a tank (10) comprising a fluidized bed (12) with a supporting part, the height (22) of which is adjustable. The edge of the inlet of the tank is equipped with a rotating roller 23$a$ over which the roving 21$a$ passes and the edge of the tank outlet is equipped with a rotating roller 23$b$ over which the roving 21$b$ passes.

FIG. 2 describes an embodiment with a single compression roller, with a tank (10) comprising a fluidized bed (12) in which a single cylindrical compression roller (24) is present and showing the angle $\alpha_1$.

The arrows at the fiber indicate the passage direction of the fiber.

FIG. 3 shows an embodiment with a single compression roller, with a tank (30) comprising a spray gun (31) for spraying powder (32) in which a single cylindrical compression roller (33) is present and showing the angle $\alpha''_1$.

The arrows at the fiber indicate the passage direction of the fiber.

FIG. 4 shows a diagram of a single heating system for heating the pre-impregnated fibrous material and finalizing the impregnation with three rollers for finalizing the impregnation.

Figure 5:
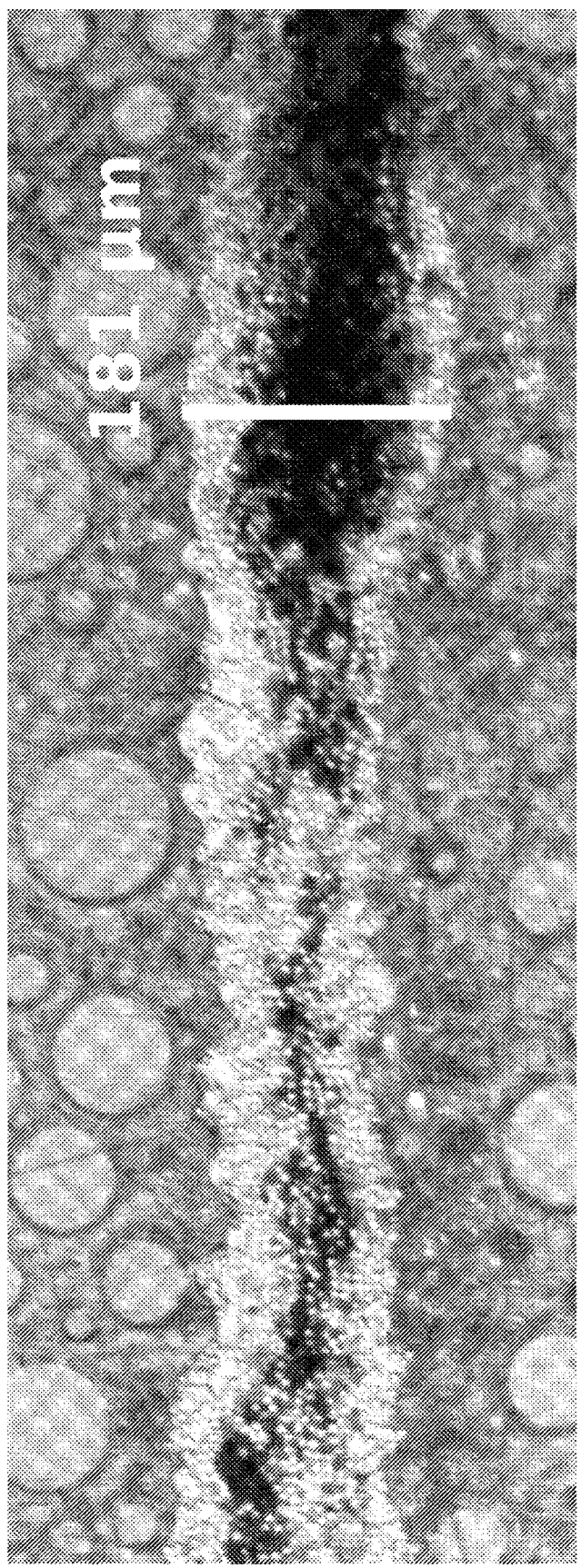
FIG. 5 shows a photo taken with a scanning electron microscope of a cross sectional view of an SGL, 50K carbon fiber roving impregnated with a PA BACT/10T polyamide powder of D50=108 μm (D90=198 μm and D10=48.3 μm) according to example 1 (before calendering).

FIG. 5 shows a photo taken with a scanning electron microscope of a cross sectional view of an SGL, 50K carbon fiber roving impregnated with a PA BACT/10T polyamide powder of D50=108 μm (D90=198 μm and D10=48.3 μm) according to example 1 and disclosed in WO 2015/121583 (before calendering).

The method according to WO 2015/121583 leads to a fibrous material which is too thick and lacks homogeneity in several areas of the impregnated roving and also a major porosity and a bad distribution of fibers.

The diameter of a fiber represents 7 μm.

Figure 6:
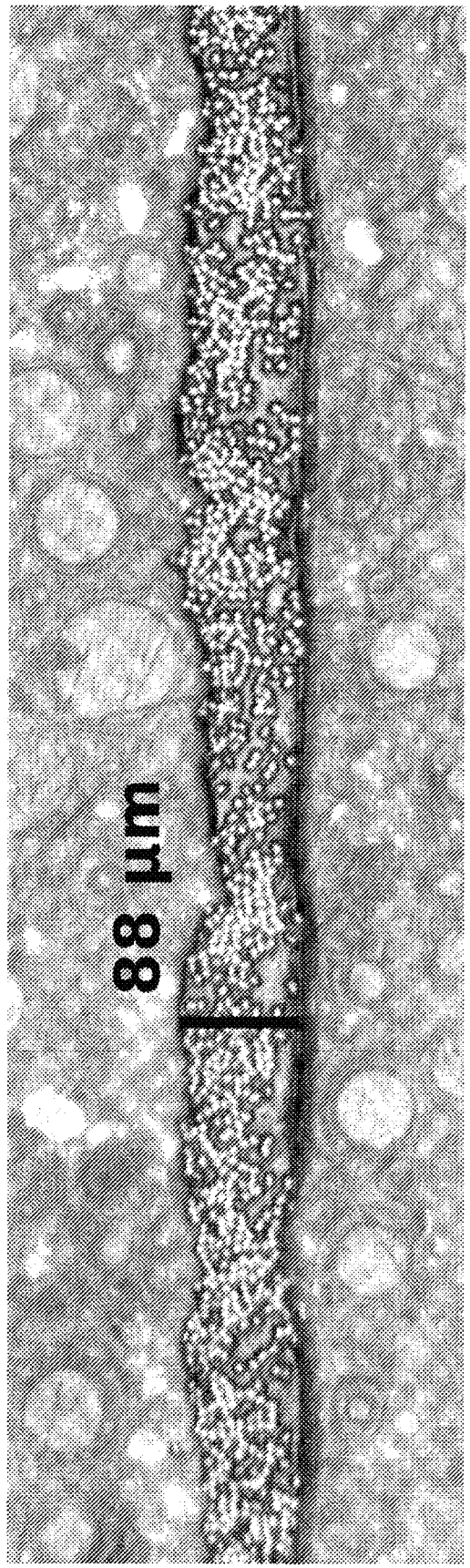
FIG. 6 shows a photo taken with a scanning electron microscope of a cross sectional view of an SGL, 50K carbon fiber roving impregnated with a PA BACT/10T polyamide powder (41/59 molar ratio) of D50=108 μm (D90=198 μm and D10=48.3 μm) according to the example 2 (before calendering).

FIG. 6 shows a photo taken with a scanning electron microscope of a cross sectional view of an SGL, 50K carbon fiber roving impregnated with a PA BACT/10T polyamide powder (41/59 molar ratio) of D50=108 μm (D90=198 μm and D10=48.3 μm) according to the invention example 2 (before calendering).

The diameter of a fiber represents 7 μm.

The strip obtained has an average thickness of less than 88 μm with a content of fibers by volume of 55%.

FIG. 7 shows an embodiment of the step of shaping and calibrating the strip (obtained in FIG. 6) at 12.7 mm to obtain the thin tape at 12.7 mm with a first notched supporter (diameter 13 mm, groove 12.7 mm) outside infrared (IR) system, two non-notched supporters (diameter 20 mm) and a notched supporter (diameter 13 mm, groove 12.7 mm) placed after the last IR heating system and heating calenders mounted in series equipped with an IR system of 1 kW each.

Figure 8:
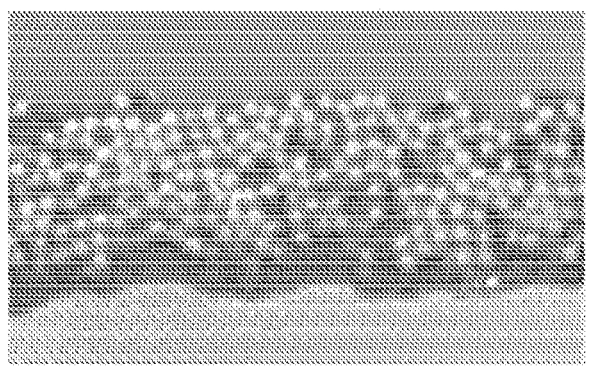
FIG. 8 shows a photo taken under optical microscopy of a cross sectional view of a T700 12 k 31E carbon fiber roving impregnated with a PA 11/BACT polyamide powder (33/67) of D50=114 μm (D90=199 μm and D10=56 μm) according to the example 5 (before calendering).

FIG. 8 shows a photo taken under optical microscopy of a cross sectional view of a T700 12 k 31E carbon fiber roving impregnated with a PA 11/BACT polyamide powder (33/67) of D50=114 µm (D90=199 µm and D10=56 µm) according to the invention example 5 (before calendering).

The diameter of a fiber represents 7 µm.

Figure 9:
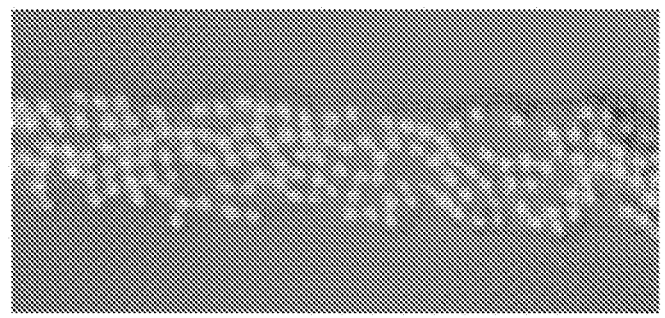
FIG. 9 shows a photo taken under optical microscopy of a cross sectional view of a T700 12 k 31E carbon fiber roving impregnated with a PA 6I/6T polyamide powder (45/55 molar ratio) of D50=136 μm (D90=225 μm and D10=75 μm) according to the example 6 (before calendering).

FIG. 9 shows a photo taken under optical microscopy of a cross sectional view of a T700 12 k 31E carbon fiber roving impregnated with a PA 6I/6T polyamide powder (45/55 molar ratio) of D50=136 µm (D90=225 µm and D10=75 µm) according to the invention example 6 (before calendering).

The diameter of a fiber represents 7 µm.

Figure 10:
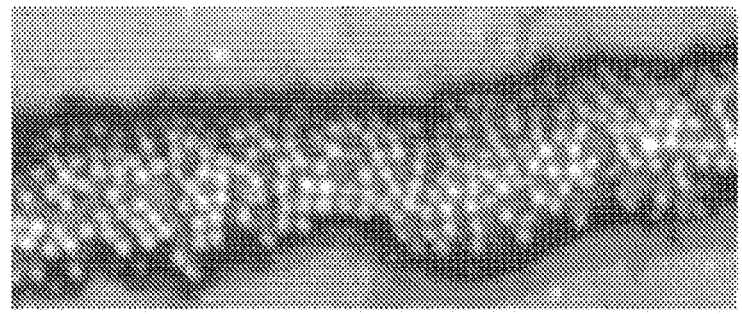
FIG. 10 shows a photo taken under optical microscopy of a cross-sectional view of a T700 12 k 31E carbon fiber roving impregnated with a PA MPMDT/10T polyamide powder (41/59 molar ratio) of D50=157 μm (D90=301 μm and D10=58 μm) according to the invention example 7 (before calendering).

FIG. 10 shows a photo taken under optical microscopy of a cross-sectional view of a T700 12 k 31E carbon fiber roving impregnated with a PA MPMDT/10T polyamide powder (41/59 molar ratio) of D50=157 µm (D90=301 µm and D10=58 µm) according to the invention example 7 (before calendering).

The diameter of a fiber represents 7 µm.

The following examples provide a non-limiting illustration of the scope of the invention.

Example 1

Comparative Example

A roving of SGL, 50K carbon fiber was impregnated with PA BACT/10T such as described in WO 2015/121583.

D50=108 µM, D90=198 µm and D10=48.3 µm

Results:

The results are given in FIG. 5 and show a lack of homogeneity in several areas of the impregnated roving and also a major porosity and a bad distribution of fibers.

Example 2

Single Layer Fibrous Material (SGL, 50K Carbon Fiber) Impregnated with BACT/10T (41/59 Molar Ratio)

The following procedure was carried out:
Four cylindrical and fixed rollers with 8 cm diameter are present upstream from the tank comprising the fluidized bed on which the roving travels.

The rollers are 54 cm apart (distance between the central axis of the first roller and the central axis of the last roller).
Preimpregnation Step by Fluidized Bed
  A cylindrical compression roller $R_1$ in the tank (L=500 mm, l=500 mm, H=600 mm), diameter 25 mm, as shown in FIG. 2.
  Residence time of 0.3 s in the powder
  Angle $\alpha_1$ of 25°
  D50=108 µm, (D10=48.3 µm, D90=198 µm) for the BACT/10T powder.
  edge of the tank equipped with a stationary roller.
Step of Heating the Pre-Impregnated Fibrous Material and Finalizing the Impregnation The heating system used is that disclosed in FIG. 4, but with eight stationary cylindrical rollers $R'_1$ to $R'_8$ with a diameter of 8 mm.

The speed of advance of the roving is 10 m/min.

The infrared used has a total power of 25 kW, the height between the infrared and the upper roller is 4 cm and the height between the infrared and the lower rollers is 9 cm.

The angles $\alpha'_1$ to $\alpha'_8$ are identical and 25°.

The height h is 20 mm.

The length l is 1,000 mm.

These eight rollers are each separated by 43 mm.

FIG. 6 shows the impregnated fibrous material obtained (strip), which has a thickness of 88 µm.

The resulting fibrous material is a single layer material which has an impregnation homogeneity and a low porosity with a very good distribution of the fibers.

Shaping and Calibrating Step for Obtaining the Thin Tape

A step of shaping the roving or said parallel rovings and of calibrating said impregnated fibrous material is carried out after leaving the second heating system as described, for example in FIG. 4, by passing a 88 µm strip (obtained in the preceding step) over a first notched supporter of 13 mm diameter (the groove measuring 12.7 mm), then passing over two non-notched rollers of 20 mm diameter and finally over a notched roller of the same diameter as the first one and of the same groove dimension, under a third heating system, particularly IR, microwave or laser heating system, in particular IR heating system with a power (for each tape or stack of parallel tapes) of between 0.1 W and 10 kW, more preferably between 0.1 and 6 kW, more preferably between 0.1 and 3 kW, even more preferably between 0.6 and 3 kW, even more preferably between 0.6 and 1.8 kW.

After passing under the third heating system, the strip shaped to 12.7 mm passes to the level of heating calenders mounted in series equipped with an IR system of 1 kW each, outside the third heating system, to obtain the thin tape with a thickness of less than 100 µm and calibrated to 12.7 mm. The fiber content being 55% by volume and the porosity level being <2%, the thickness of the thin tape is 66 µm.

FIG. 7 describes this exemplary embodiment.

Example 3

Determination of the Porosity Level by Image Analysis

The porosity was determined by image analysis on a roving of SGL 50K carbon fiber impregnated with BACT/10T (41/59 molar ratio) in fluidized bed followed by a heating step such as defined above.

It is less than 5%.

Example 4

Determination of the Porosity Level the Relative Deviation between Theoretical Density and Experimental Density (General Method)
a) The Required Data Are:
  The density of the thermoplastic matrix
  The density of the fibers
  The grammage of the reinforcement:
    linear mass (g/m) for example for a ¼ inch tape (coming from a single roving)
    surface density (g/m²) for example for a wider tape or a fabric
b) Measurements to be Carried Out:
The number of samples must be at least 30 in order for the result to be representative of the studied material:
The measurements to be carried out are:
  The size of the samples taken:
  Length (if linear mass is known).
  Length and width (if surface density is known).

The experimental density of the samples taken:
Mass measurements in the air and in water.
The measurement of the fiber level is determined according to ISO 1172:1999 or by thermogravimetric analysis (TGA) as determined for example in the document B. Benzler, Applikationslabor, Mettler Toledo, Giesen, UserCom 1/2001.
The measurement of the carbon fiber level can be determined according to ISO 14127:2008.
Determination of the Theoretical Mass Fiber Level:
a) Determination of the Theoretical Mass Fiber Level:

$$\%Mf_{th} = \frac{m_l.L}{Me_{air}}$$

With
$m_l$ the linear mass of the tape,
L the length of the sample, and
$Me_{air}$ the mass of the sample measured in the air.
The variation of the mass fiber level is presumed to be directly related to a variation of the matrix level without taking into account the variation of the quantity of fibers in the reinforcement.
b) Determination of the Theoretical Density:

$$d_{th} = \frac{1}{\frac{1-\%Mf_{th}}{d_m} + \frac{\%Mf_{th}}{d_f}}$$

With $d_m$ and $d_f$ the respective densities of the matrix and the fibers.
The theoretical density thus calculated is the accessible density if there is no porosity in the samples.
c) Evaluation of the Porosity:
The porosity then is the relative deviation between theoretical density and experimental density.

Example 5

Single Layer Fibrous Material (Toray T700 12 k 31E Carbon Fiber) Impregnated with 11/BACT (33/67 Molar Ratio)
The same procedure as for Example 2 was used to impregnate a fibrous material (Toray T700 12 k 31E carbon fiber of 7 μm diameter) with an 11/BACT powder of D50=114 μm, (D10=56 μm, D90=199 μm).
FIG. 8 shows the obtained results.

Example 6

Single Layer Fibrous Material (Toray T700 12 k 31E Carbon Fiber) Impregnated with PA 6I/6T (45/55 Molar Ratio)
The same procedure as for Example 2 was used to impregnate a fibrous material (Toray T700 12 k 31E carbon fiber of 7 μm diameter) with a PA 6I/6T powder of D50=136 μm (D90=225 μm and D10=75 μm).
FIG. 9 Shows the Obtained Results.

Example 7

Single Layer Fibrous Material (Toray T700 12 k 31E Carbon Fiber) Impregnated with MPMDT/10T (41/59 Molar Ratio)
The same procedure as for Example 2 was used to impregnate a fibrous material (Toray T700 12 k 31E carbon fiber of 7 μm diameter) with a PA MPMDT/10T powder of D50=157 μm, (D90=301 μm and D10=58 μm).
FIG. 10 Shows the Obtained Results.

The invention claimed is:
1. An impregnated fibrous material comprising at least one fibrous material consisting of continuous fibers and:
   at least one non-reactive thermoplastic polymer matrix, or
   at least one reactive thermoplastic prepolymer, which is a precursor of said non-reactive thermoplastic polymer, optionally mixed with a chain extender,
   wherein said at least one non-reactive thermoplastic polymer or said reactive prepolymer is an amorphous polymer or prepolymer having a glass transition temperature such that Tg≥80° C., or is a semi-crystalline polymer or prepolymer having a melting temperature Tm≥150° C., the fiber content in said pre-impregnated fibrous material being between 45 and 65% by volume, and the average thickness of said impregnated fibrous material being between 10 μm and 100 μm, independently of the number of fibers present in said fibrous material before impregnation,
   wherein the thermoplastic polymer is not polyamide 6 (PA-6),
   wherein said impregnated fibrous material is a single-layer material, and
   wherein the porosity level in said impregnated fibrous material is less than 10%.
2. The impregnated fibrous material according to claim 1, wherein the number of fibers in said fibrous material for carbon fibers is greater than or equal to 12K, or the grammage for the glass fiber is greater than or equal to 1,200 Tex.
3. The impregnated fibrous material according to claim 1, wherein the fibers of the fibrous material are non-sized fibers.
4. The impregnated fibrous material according to claim 1, wherein the content of fibers by volume is constant in at least 70% of the volume of the impregnated fibrous material.
5. The impregnated fibrous material according to claim 1, wherein the porosity level in said impregnated fibrous material is greater than 0% and less than 10%.
6. The impregnated fibrous material according to claim 1, wherein said at least one thermoplastic polymer is selected from: polyaryl ether ketones (PAEK); polyaryl ether ketone ketone (PAEKK); aromatic polyether imides (PEI); polyaryl sulfones; polyarylsulfides; polyamides (PA); PEBAs; polyolefins; and mixtures thereof.
7. The impregnated fibrous material according to claim 1, wherein the at least one thermoplastic polymer is selected from polyamides, PEKK, PEI and a mixture of PEKK and PEI.
8. The impregnated fibrous material according to claim 7, wherein said polyamide is selected from aliphatic polyamides, cycloaliphatic polyamides and semi-aromatic polyamides (polyphthalamides).
9. The impregnated fibrous material according to claim 8, wherein said aliphatic polyamide is selected from polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), polyamide 11/1010, polyamide 12/1010, or a mixture thereof or a copolyamide thereof, and block copolymers.
10. The impregnated fibrous material according to claim 8, wherein said polyamide is a semi-aromatic polyamide selected from a PA MPMDT/6T, a PA PA11/10T, a PA 11/BACT, a PA 11/6T/10T, a PA MXDT/10T, a PA MPMDT/

10T, a PA BACT/10T, a PA BACT/6T, PA BACT/10T/6T, a PA 11/BACT/6T, PA 11/MPMDT/10T, a PA 11/BACT/10T, or a PA 11/MXDT/10T.

11. The impregnated fibrous material according to claim 1, wherein said fibrous material comprises continuous fibers selected from carbon, glass, silicon carbide, basalt or basalt-based, silica, natural fibers, or amorphous thermoplastic fibers with a glass transition temperature Tg higher than the Tg of said polymer or said polymer mixture when the latter is amorphous or higher than the Tm of said polymer or said polymer mixture when the latter is semicrystalline, or the semicrystalline thermoplastic fibers with a melting temperature Tm higher than the Tg of said polymer or said polymer mixture when the latter is amorphous or higher than the Tm of said polymer or said polymer mixture when the latter is semicrystalline, or a mixture of two or more of said fibers.

12. The impregnated fibrous material according to claim 1, wherein said thermoplastic polymer further comprises carbonaceous fillers.

13. The impregnated fibrous material according to claim 1, wherein said thermoplastic prepolymer further comprises liquid crystal polymers or cyclic poly(butylene terephthalate), or mixtures containing said liquid crystal polymers or said cyclic poly(butylene terephthalate) as additives.

14. The impregnated fibrous material according to claim 1, wherein said impregnated fibrous material corresponds to a strip.

15. The impregnated fibrous material according to claim 1, wherein said impregnated fibrous material corresponds to a thin tape.

16. The impregnated fibrous material according to claim 1, wherein the impregnated fibrous material is prepared by a step of heating the pre-impregnated fibrous material and of finalizing the impregnation by means of at least one heating system provided with at least one supporting part, and the step of heating a pre-impregnated fibrous material and finalizing the impregnation is carried out with two separate heating systems.

17. A method for preparing an impregnated fibrous material, as defined in claim 1, wherein the method comprises a step of heating the pre-impregnated fibrous material and of finalizing the impregnation by means of at least one heating system provided with at least one supporting part (E) and optionally a step of shaping and calibrating the roving or said parallel rovings of an impregnated fibrous material.

18. The method according to claim 17, wherein the shaping and calibration step is preceded by said step of heating the pre-impregnated fibrous material and of finalizing the impregnation.

19. The method according to claim 17, wherein the step of heating a pre-impregnated fibrous material and finalizing the impregnation is carried out with the same heating system.

20. The method according to claim 17, wherein the step of heating a pre-impregnated fibrous material and finalizing the impregnation is carried out with two separate heating systems.

21. The method according to claim 17, wherein the step of heating a pre-impregnated fibrous material and of finalizing the impregnation is preceded by a step of pre-impregnating the fibrous material.

22. The method according to claim 17, comprising the following steps:
   i) pre-impregnating a fibrous material particularly by powder deposition, by molten route, particularly by pultrusion, by cross-head extrusion of molten polymer, by continuous passage of the fibers in an aqueous polymer powder dispersion or aqueous polymer particle dispersion or aqueous polymer emulsion or suspension, by fluidized bed, equipped or not with at least one supporter (E'), by spraying by nozzle or spray gun by dry route in a tank equipped or not equipped with at least one supporter (E') in order to obtain a pre-impregnated fibrous material,
   ii) the step of heating said pre-impregnated fibrous material and finalizing the impregnation to obtain an impregnated fibrous material consisting of a tape in the form of a strip having an average thickness of less than or equal to 100 µm,
   iii) optionally the step of shaping and calibrating the roving or said parallel rovings of said impregnated fibrous material to obtain an impregnated fibrous material consisting of a tape in the form of a thin tape having an average thickness of less than or equal to 100 µm.

23. The method according to claim 17, carried out at a speed of at least 10 m/min.

* * * * *